US011958730B2

(12) United States Patent
Xu et al.

(10) Patent No.: US 11,958,730 B2
(45) Date of Patent: Apr. 16, 2024

(54) CARRIER

(71) Applicant: ZHEJIANG E-P EQUIPMENT CO., LTD., Huzhou (CN)

(72) Inventors: Hongpeng Xu, Huzhou (CN); Li Chen, Huzhou (CN); Yongxian Ke, Huzhou (CN); Tao Huang, Huzhou (CN); Guoxiang Yang, Huzhou (CN)

(73) Assignee: ZHEJIANG E-P EQUIPMENT CO., LTD. (CN)

( * ) Notice: Subject to any disclaimer, the term of this patent is extended or adjusted under 35 U.S.C. 154(b) by 360 days.

(21) Appl. No.: 17/554,890

(22) Filed: Dec. 17, 2021

(65) Prior Publication Data

US 2022/0411244 A1 Dec. 29, 2022

(30) Foreign Application Priority Data

Jun. 26, 2021 (CN) ......................... 202121431750.6

(51) Int. Cl.
*B66F 9/07* (2006.01)
*B66F 9/075* (2006.01)
*B66F 9/22* (2006.01)

(52) U.S. Cl.
CPC ...... *B66F 9/07513* (2013.01); *B66F 9/07536* (2013.01); *B66F 9/07572* (2013.01); *B66F 9/22* (2013.01)

(58) Field of Classification Search
CPC ......................... B66F 9/07531; B66F 9/07536
See application file for complete search history.

(56) References Cited

U.S. PATENT DOCUMENTS

| | | | | |
|---|---|---|---|---|
| 4,756,978 | A | 7/1988 | Nitcher et al. | |
| 5,441,123 | A | 8/1995 | Beckley | |
| 7,398,848 | B2 * | 7/2008 | Kondo | B60K 1/04 180/68.5 |
| 8,327,962 | B2 * | 12/2012 | Bergmeier | B60K 1/04 220/834 |
| 8,412,431 | B2 | 4/2013 | Wetterer et al. | |
| 8,413,947 | B2 | 4/2013 | Chiang | |
| 8,540,213 | B2 | 9/2013 | Feiquan et al. | |
| 9,421,963 | B2 | 8/2016 | Wetterer et al. | |
| 9,475,513 | B2 | 10/2016 | Liu et al. | |
| 9,586,605 | B2 | 3/2017 | He et al. | |
| 9,718,661 | B1 | 8/2017 | Hoffman | |
| D801,616 | S | 10/2017 | Qichen et al. | |

(Continued)

*Primary Examiner* — Jonathan Snelting
(74) *Attorney, Agent, or Firm* — Cook Alex Ltd.

(57) ABSTRACT

A carrier vehicle includes a front frame and a rear frame conveniently attachable to and detachable from the front frame. The front frame includes a frame body, at least one battery structure installed along an inner front side wall of the frame body and a connecting rod wheel component at a transverse bottom of the frame body. The rear frame comprises an operating handle, a handle joint base, a hydraulic component having an oil cylinder, a bearing component and a driving assembly. A bottom end of the operating handle is rotatably connected to the handle joint base, which includes a joint fixing base and a microswitch. The bearing component includes a bearing bridge having bridge lugs detachably connected to ends thereof, and a middle part sleeved on the oil cylinder. The front frame and rear frame are transportable in a separated compact configuration, with later simple and fast assembly.

10 Claims, 16 Drawing Sheets

(56) References Cited

U.S. PATENT DOCUMENTS

| | | | | |
|---|---|---|---|---|
| D805,712 | S | 12/2017 | Qichen et al. | |
| 9,840,350 | B2 | 12/2017 | Moran et al. | |
| 9,879,765 | B2 | 1/2018 | Hongpeng et al. | |
| 9,908,762 | B1 | 3/2018 | Hongpeng et al. | |
| 9,966,712 | B1 | 5/2018 | Hongpeng et al. | |
| D819,923 | S | 6/2018 | Qichen et al. | |
| D824,633 | S | 7/2018 | Qichen et al. | |
| 10,014,141 | B1 | 7/2018 | Zheng et al. | |
| 10,093,336 | B2 | 10/2018 | Pan et al. | |
| 10,173,709 | B2 | 1/2019 | Zheng et al. | |
| 10,538,422 | B2 | 1/2020 | Lijian et al. | |
| 10,640,348 | B2 * | 5/2020 | Pan | B66F 17/003 |
| 10,730,728 | B1 | 8/2020 | Qichen et al. | |
| 10,836,620 | B2 | 11/2020 | Jiandong et al. | |
| 10,913,475 | B2 | 2/2021 | Kalinowski et al. | |
| 11,299,052 | B2 * | 4/2022 | Rosenberg | B66F 9/07504 |
| 11,613,182 | B2 * | 3/2023 | Clark | H01M 50/20<br>180/68.5 |
| 2007/0137904 | A1 | 6/2007 | Rose et al. | |
| 2010/0025126 | A1 | 2/2010 | Nakatsu et al. | |
| 2012/0048629 | A1 * | 3/2012 | Magens | B60L 50/66<br>180/65.31 |
| 2014/0195127 | A1 | 7/2014 | Hoffman | |
| 2015/0102274 | A1 | 4/2015 | He et al. | |
| 2015/0266543 | A1 | 9/2015 | Marioni | |
| 2018/0009643 | A1 | 1/2018 | Hoffman | |
| 2019/0322509 | A1 | 10/2019 | Jianming et al. | |

* cited by examiner

CARRIER

TECHNICAL FIELD

The present disclosure relates to the technical field of carriers, in particular to a carrier in a configuration of a pallet truck vehicle.

BACKGROUND ART

An electric carrier in the form of a typical pallet truck vehicle mainly comprises components such as a front frame, a rear frame, a connecting rod component, an electric control unit (controller), a hydraulic station (including a lifting oil cylinder), an operation unit, a battery and a drive. The front frame, the rear frame, the connecting rod component and the lifting oil cylinder constitute the main frame structure of the vehicle, which are the main structural components for lifting and transporting the vehicle.

At present, a battery, a hydraulic station, a controller and other components will be assembled and provided in a carriage of the front frame of the conventional electric carrier. When lifting, high-pressure oil from the hydraulic station in the front frame will be driven into the lifting cylinder through an oil pipe. Each command switch on an operating handle sends various operational signals to the controller through a wire harness cable. The controller is connected with one or more actuators, such as for the drive and the hydraulic station, through the wire harness cable to control the respective actuator to execute various related actions. The front and rear frames and the original parts of each system typically are connected by a wire harness cable and an oil pipe during initial construction and assembly of the vehicle, and the vehicle leaves the factory in the form of a completed, whole assembly for shipping and use, and cannot have independent portions easily detached after having bene fully assembled. Because the construction results in a fully assembled vehicle, the assembly process of the vehicle is difficult, the build rate is slow, the finishing and debugging process is cumbersome and occupies a large space, and the size of the whole, fully assembled vehicle requires a large amount of packing, storage and shipping or transporting space.

SUMMARY

The purpose of the present disclosure is to provide an improved carrier, which avoids typical assembly, packaging and transportation practices and disadvantages associated therewith, and which instead is convenient for buyers to transport in a more compact disassembled configuration, with the vehicle being easy and quick to assemble after transportation. The carrier, in the configuration of a pallet truck vehicle, also has a compact structure after final assembly, while having suitable carrying capacity.

In order to achieve the above purpose, the main technical solution of the present disclosure is a carrier, in a configuration of a pallet truck vehicle, which comprises a front frame and a rear frame, wherein the rear frame is quickly and conveniently attachable to and detachable from the front frame.

The front frame comprises a frame body, at least one battery structure installed on a vertically extending inner front side wall of the frame body and a wheel connecting rod component provided transversely at the bottom of the frame body. The battery structure comprises a battery main body, a pluggable component and a handle. The battery handle is connected to the top or side of the battery main body. The pluggable component comprises at least one pluggable end which is capable of being inserted into the battery main body, so that the pluggable component becomes electrified when plugged into the battery. An installing guide rail is provided on the vertically extending inner front side wall of the frame body. An opening is provided at the top or side of the frame body, and the battery main body is capable of being inserted into the installing guide rail vertically or transversely for fixation via the respective top or side opening.

The connecting rod wheel component comprises a connecting arm at the rear of the connecting rod component that is connected to the wheels at the front of forward extending forks.

The rear frame comprises an operating handle, a handle joint base, a hydraulic component, a bearing component and a driving assembly. A bottom end of the operating handle is rotatably connected to the handle joint base. The handle joint base comprises a joint fixing base and a microswitch detachably connected to the joint fixing base. A trigger component is provided in the joint fixing base. A first end of a trigger part of the trigger component abuts against the microswitch and triggers the microswitch to be turned on or off by moving the trigger part, and the second end of the trigger part abuts against the bottom end of the operating handle and drives the trigger part to move by rotating the operating handle upward or downward. The handle joint base is connected to the hydraulic component. The hydraulic component comprises an oil cylinder. The bearing component comprises a bearing bridge and bridge lugs. Both ends of the bearing bridge are detachably connected with the bridge lugs, respectively. The middle part of the bearing bridge is sleeved on the oil cylinder. The oil cylinder is fixedly connected with a top shaft head end of the driving assembly through a pin shaft. The top of the hydraulic component is connected to the front frame, and the connecting arms are detachably and rotatably connected to the bridge lugs, respectively.

In some examples, the microswitch comprises a contact capable of triggering to be turned on or off. Part of a surface of the contact is exposed outside a housing of the microswitch, and the surface of at least the exposed part is an arc-shaped surface. The outer wall surface at the first end of the trigger part is a wedge-shaped surface matched with the arc-shaped surface of the part of the surface of the contact that is exposed outside the housing. The operating handle rotates to press the second end of the trigger part, and urges the outer wall surface of the first end to abut and force against the arc-shaped surface, driving the contact to move into the housing to trigger the microswitch to be turned on or off.

In some examples, the driving assembly comprises a box body, a driving motor, a driving wheel component and a controller, wherein the driving wheel component and the driving motor are all installed on the box body. The output shaft of the driving motor indirectly drives the driving wheel component to rotate through meshing of a gear set. The controller is detachably connected to the box body and located on a side wall near a top of the box body, and the controller is connected with a driving motor circuit.

In some examples, the side wall of the top of the box body is provided with an installation area for installing the controller. The installation area is inclined and provided with a plurality of installation holes. The controller is provided with a plurality of connection holes corresponding to the installation holes. The controller is connected and mounted on the installation area by screws penetrating through the connection holes and the installation holes.

The driving wheel component is provided on the side wall near the bottom end of the box body. The driving motor is provided on the side wall of the box body on the same side as the driving wheel component, and the driving motor is positioned above the driving wheel component. The gear set comprises a first gear, a second gear, a third gear and a fourth gear which are sequentially meshed in oblique teeth and rotatably connected in parallel to the frame box body. The driving assembly further comprises a box cover which is detachably connected to the box body and at least covers the gear set.

In some examples, a bearing base is provided in a middle of the bearing bridge, and a bottom end of the oil cylinder penetrates through an inner ring of the bearing base. The inner ring of the bearing base is provided with a self-lubricating bearing, and the inner ring of the self-lubricating bearing is sleeved on an outer wall surface of the bottom end of the oil cylinder. A thrust ball bearing is installed above the bearing base. The thrust ball bearing is located on the same axis as the bearing base. A retaining ring is provided on the outer wall of the oil cylinder, and the thrust ball bearing is clamped between the retaining ring and the bearing base.

In some examples, one end of the top of the battery main body is provided with a fixedly mounted elastically deformable bar, and a gap exists between the elastically deformable bar and the central portion of the rest of the top of the battery main body.

The pluggable component comprises an inclined guide block. When the pluggable component is plugged into the battery main body, the inclined guide block is inserted into the gap, and the inclined surface of the inclined guide block abuts against and forces an upper end of the elastically deformable bar to deflect outward.

In some examples, the carrier comprises a battery structure, the vertically extending inner front side wall of the front frame is provided with a U-shaped installing guide rail, the top of the front frame is provided with an opening, and a handle is connected to the top of the battery main body. The battery main body is insertable into the installing guide rail for fixation via the opening, and both the handle and the pluggable component are located at the opening.

In some examples, a side wall of the front frame is provided with a frame limiting groove. When the battery main body is provided in the installing guide rail, an elastically deformable bar is positioned at the frame limiting groove. The pluggable component is plugged into the battery main body and becomes electrified, and an end part of the elastically deformable bar deflects and moves into the frame limiting groove to be in a locked position, so as to limit the battery main body from moving upward and being separated from the installing guide rail.

In some examples, the carrier includes two battery structures. A transverse installing guide rail is provided on the vertically extending inner front side wall of the front frame. Two opposite sides of the frame body are provided with an opening, respectively. A handle is connected and fixed to the side of each battery main body, and the two battery structures are moved transversely from the two openings to the installing guide rail in the front frame for fixation, respectively.

In some examples, the bottom of the battery main body is provided with a positioning groove which is recessed inward. The vertically extending inner front side wall of the front frame includes a rearward extending limit stopper. The limit stopper is located in the middle of the installing guide rail and divides the installing guide rail into two installation areas evenly, and a resilient tab is symmetrically provided on the installing guide rail in each installation area. When the battery main body moves transversely, the resilient tab is deformed and eventually reaches the positioning groove in the bottom of the battery main body to be in a removable locked position. An installing channel is provided at the top of the front frame, and the pluggable component comprises two pluggable ends. The pluggable component is vertically installed from the installing channel and is plugged and becomes electrified with the tops of two battery main bodies, at the same time.

By adopting the above technical scheme, the present utility model may achieve some or all of the following effects and advantages: 1) it is more convenient and faster to assemble as a front frame and separate rear frame for transport, is compact in structure, environmentally friendly, and suitable for small tonnage transportation; 2) a micro-switch is adopted, and the adjustable stroke is small, at the same time, the load can be applied in any angle direction in a plane, and the switching sensitivity is improved; 3) the oil cylinder and the driving assembly are connected by a pin shaft, which provides a simple, economical connection mode which is convenient to install without driving cables passing through the bearing bridge; 4) the bearing bridge and the bridge lugs provide for detachable assembly and sub-packaging; 5) two alternative battery pluggable front frame structures are provided, which also reflects the simplicity of assembly and significantly improves the ability to keep the carrier operating; and 6) a modular assembly method of the carrier is provided, which breaks the original mode of assembly and delivery of full vehicles, and is convenient for buyers to transport and simple to assemble the vehicle after delivery of the front frame and rear frame.

Figure 1:
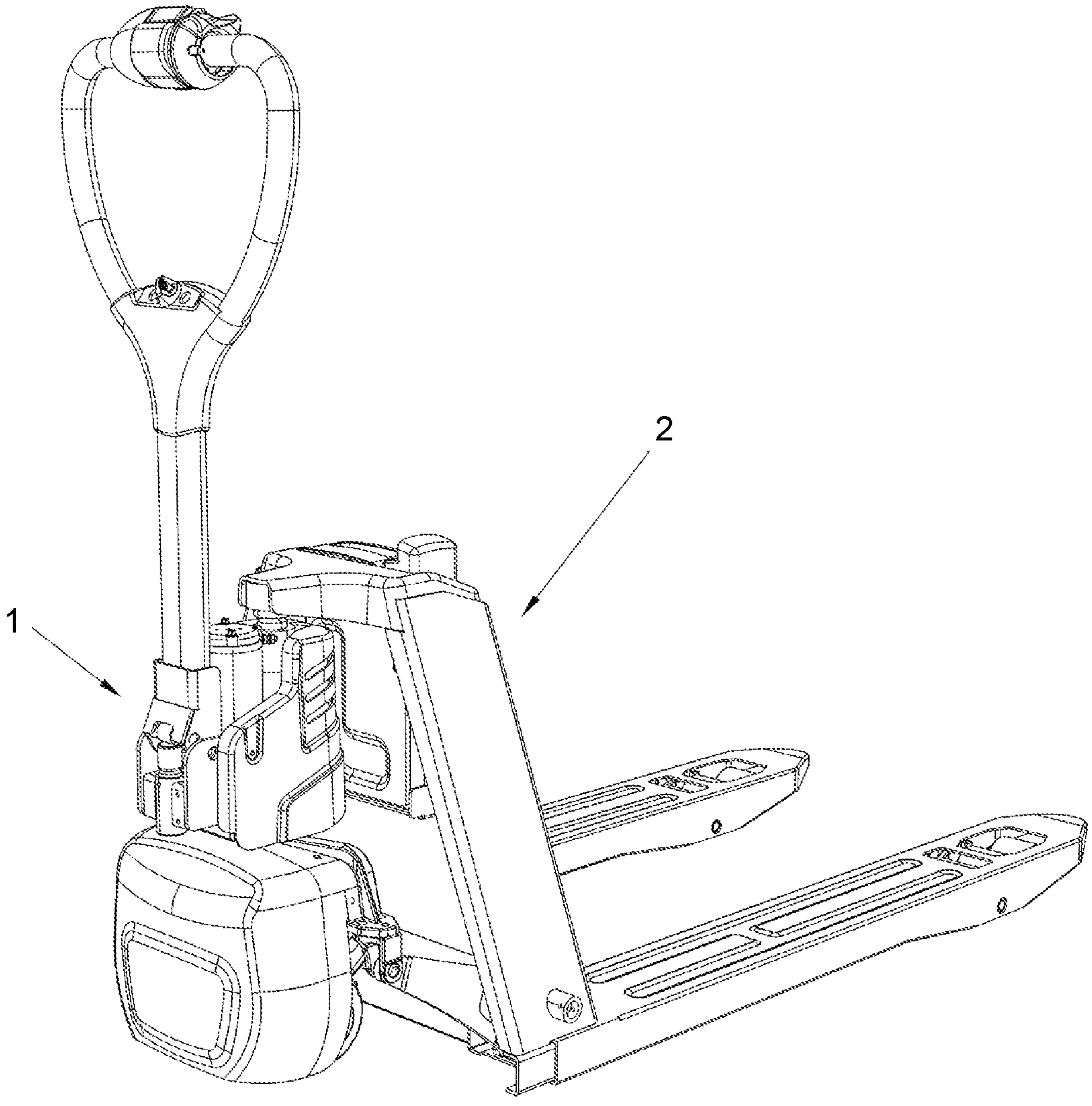
FIG. 1 is a rear perspective structural schematic diagram of a first embodiment of a carrier of the present disclosure, in a configuration of a pallet truck vehicle.

The figures include: rear frame 1, operating handle 11, hydraulic component 12, oil cylinder 121, bearing bridge 122, bridge lug 123, driving assembly 13, shaft head end 131, passage hole 132, pin shaft 1321, thrust ball bearing 1322, self-lubricating bearing 1323, retaining ring 1324, controller 133, brake 134, box cover 135, driving wheel component 136, driving motor 137, installing area 138, box body 139, fourth gear 1391, third gear 1392, second gear 1393, first gear 1394, handle joint base 14, trigger component 141, trigger shaft body 1411, resilient member 1412, joint fixing base 1413, fixed shaft cylinder 1414, through hole 1415, microswitch 142, switch 1421, interlock base 1422, ball 1423, plectrum 1424, pressing plunger 1425, abutting hole 1426, avoidance space 1427, positioning step surface 1428, clamping groove 1429, front frame 2, installing guide rail 21, battery structure 22, fixedly mounted elastically deformable bar 221, handle 222, battery main body 223, frame limiting groove 224, socket 225, connecting rod wheel component 23, connecting arm 231, wheel frame 232, opening 24, pluggable component 25, holding member 251, inclined guide block 252, indicator light 253, sub-connector 254, a pluggable bracket 255, main connector 256, frame body 26, limit stopper 261, installing area 262, resilient tab 263, auxiliary assembly line 7, first assembly line 8, loading station 81, assembling station 82, welding station 83, painting repair station 84, turning station 85, detection tool 9, clamping cavity 91, scale 93, cylinder 94, spring 95, counterweight simulation block 96, guide column 97, bracket 98, and roller 99.

DETAILED DESCRIPTION OF THE EMBODIMENTS

The following description is used to disclose the present embodiments of carriers. The preferred embodiments in the following description are only taken as examples, and other variations consistent with the claims herein may be conceivable by those skilled in the art. The basic principles of the present disclosure defined in the following description may be applied to other embodiments, modifications, improved schemes, equivalent schemes and other technical schemes without departing from the spirit and scope of the present disclosure.

It should be understood by those skilled in the art that in the present disclosure the orientation or positional relationship indicated by terms such as, “longitudinal”, “transverse”, “upper”. “lower”, “front”, “rear”, “left”, “right”, “vertical”, “horizontal”, “top”, “bottom”, “inner”, “outer”, etc. are based on the orientation or positional relationship shown in the drawings, which is only for convenience of describing the present embodiments and simplifying the description, rather than indicate or imply that the claimed device or element must have a specific orientation, be constructed and operated in a specific orientation, such that the above terms should not be understood as limiting the present disclosure or claimed subject matter. It also will be understood that for convenience of viewing structural features of the carriers disclosed, the oil pipe and some other features of the hydraulic component, all of which are within the rear frame, are not shown, which also is the case with respect to the electrical wiring or cabling.

It may be understood that the term “one” should be understood as “at least one” or “one or more”, that is, in one embodiment, the number of elements may be one, while in other embodiments, the number of the elements may be multiple. Accordingly, the term “one” should not be understood as limiting a number.

Embodiments of alternative carriers are first described in reference to FIGS. 1-24 of the drawings of the present disclosure. According to a first embodiment seen in FIG. 1, a carrier in the form of a pallet truck comprises a front frame 2 and a rear frame 1 which are effectively modular in that the rear frame 1 is easily and quickly detachable from and attachable to the front frame 2. As seen in FIG. 2, the front frame 2 comprises a frame body 26, at least one battery structure 22 installed on the vertically extending inner front side wall of the frame body 26 and a connecting rod wheel component 23 provided at the transverse bottom of the frame body 26. The battery structure 22 seen in FIGS. 2-4 includes a battery main body 223, a pluggable component 25 and a handle 222. The handle 222 may be detachably connected to the top or side of the battery main body 223. The pluggable component 25 comprises at least one pluggable end which is capable of being inserted into the battery main body 223, so that the pluggable component becomes electrified when plugged into the battery main body 223.

Figure 6:
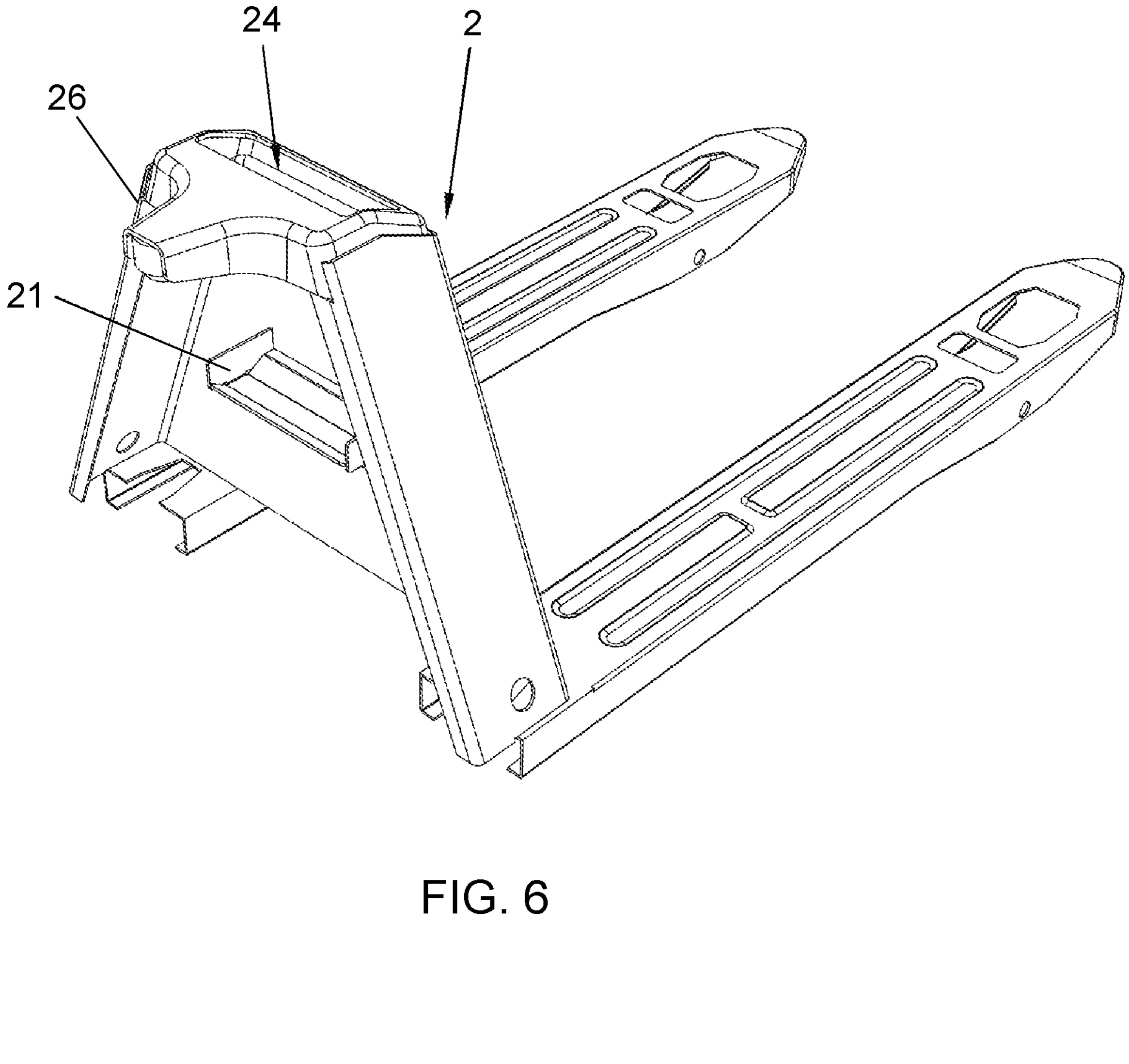
FIG. 6 is a rear perspective structural schematic diagram of a front frame according to the embodiment of FIG. 1.

An installing guide rail 21, seen in FIG. 6, is provided on the vertically extending inner front side wall of the frame body 26. An opening 24 is provided at the top (first example embodiment) or side (second example embodiment) of the frame body 26, and the battery main body 223 is insertable into the installing guide rail 21 vertically for fixation via the opening 24.

Figure 2:
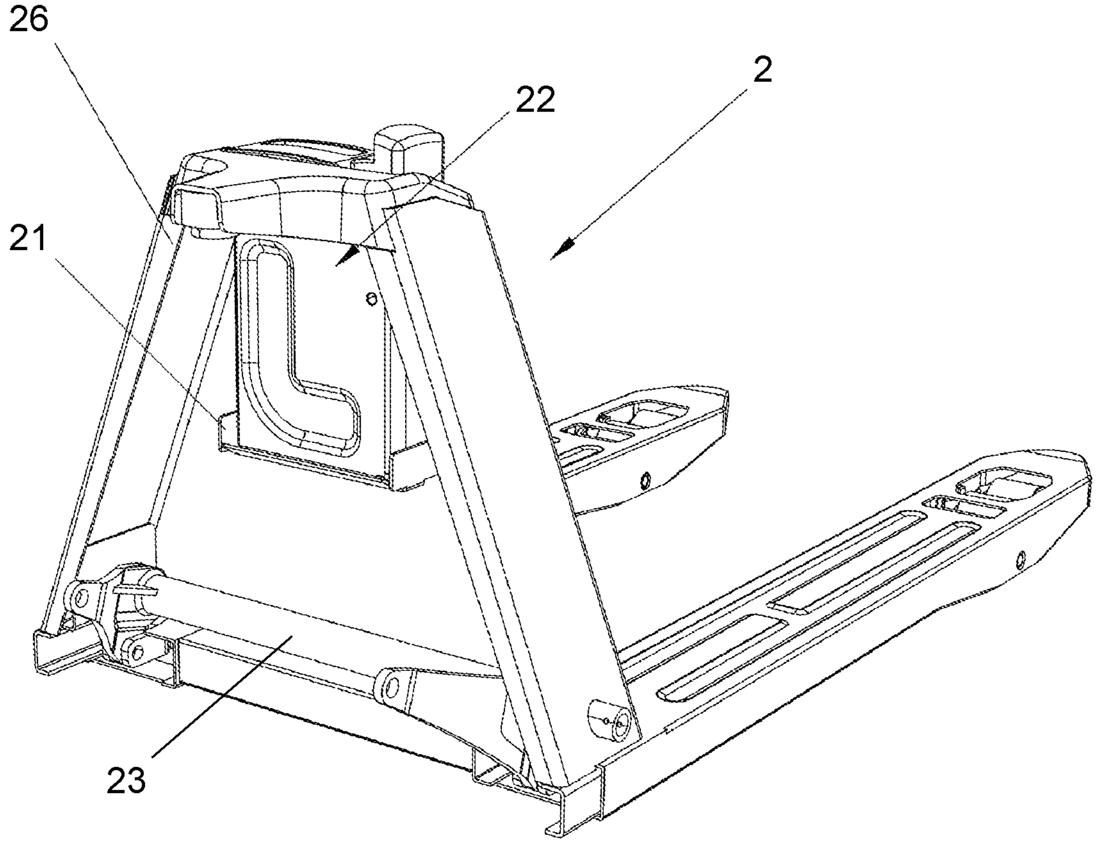
FIG. 2 is a rear perspective structural schematic diagram of a front frame including a battery according to the embodiment of FIG. 1.
Figure 16:
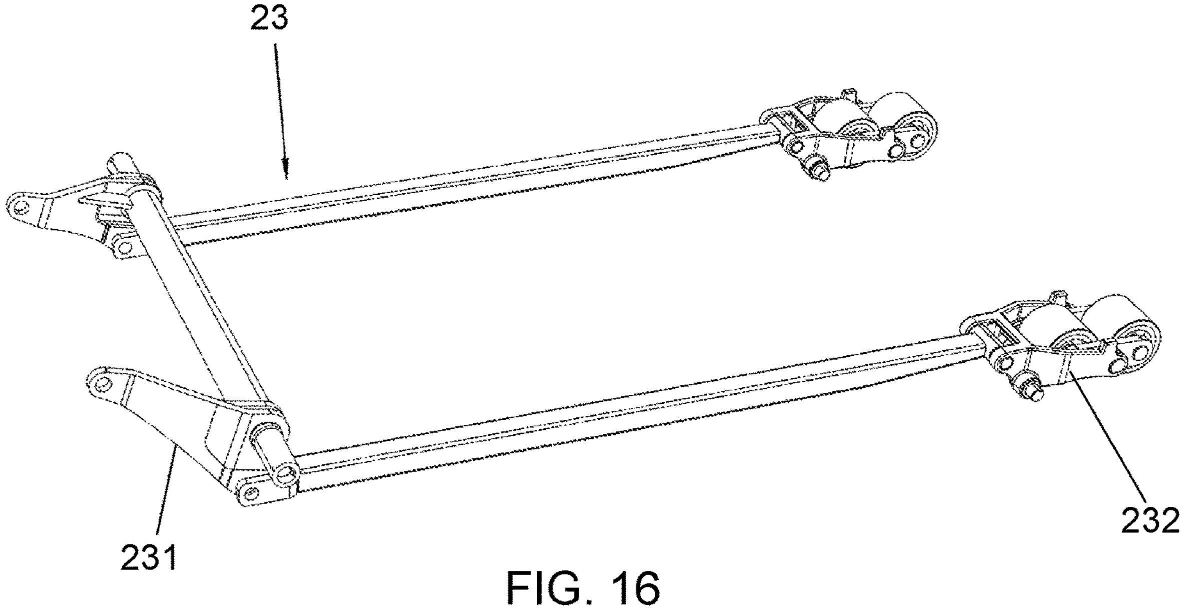
FIG. 16 is a perspective structural schematic diagram of a connecting rod wheel component according to the embodiment of FIG. 1.

The connecting rod wheel component 23, seen in FIGS. 1-2 and 16, includes a connecting arm 231 and a wheel frame 232, which is rotatably connected to at least one wheel or roller. The rear frame 1 is seen in FIGS. 7 and 11-13, and includes an operating handle 11, a handle joint base 14, a hydraulic component 12, a bearing component and a driving assembly 13. The bottom end of the operating handle 11 is rotatably connected to the handle joint base 14. The handle joint base 14 includes a joint fixing base 1413 and a microswitch 142 detachably connected to the joint fixing base 1413. A trigger component 141 is provided in the joint fixing base 1413. A first end of a trigger part of the trigger component 141 abuts against the microswitch 142 and triggers the microswitch 142 to be turned on or off by moving the trigger part, and the second end of the trigger part abuts against a bottom end of the operating handle 11 and drives the trigger part to move by rotating the operating handle 11 upward or downward relative to the handle joint base 14.

Figure 8:
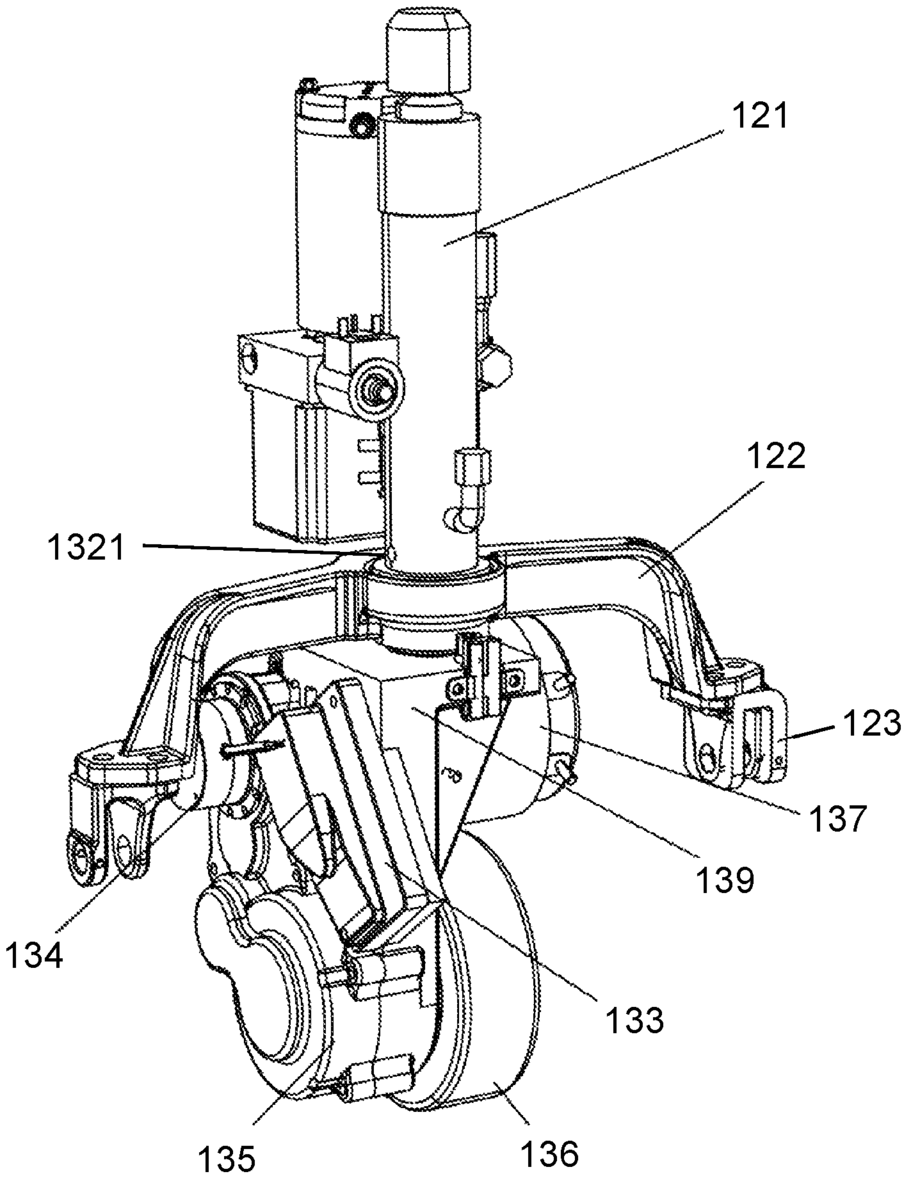
FIG. 8 is a front perspective structural schematic diagram of a combination of a hydraulic component, a bearing component and a driving assembly according to the embodiment of FIG. 1.
Figure 17:
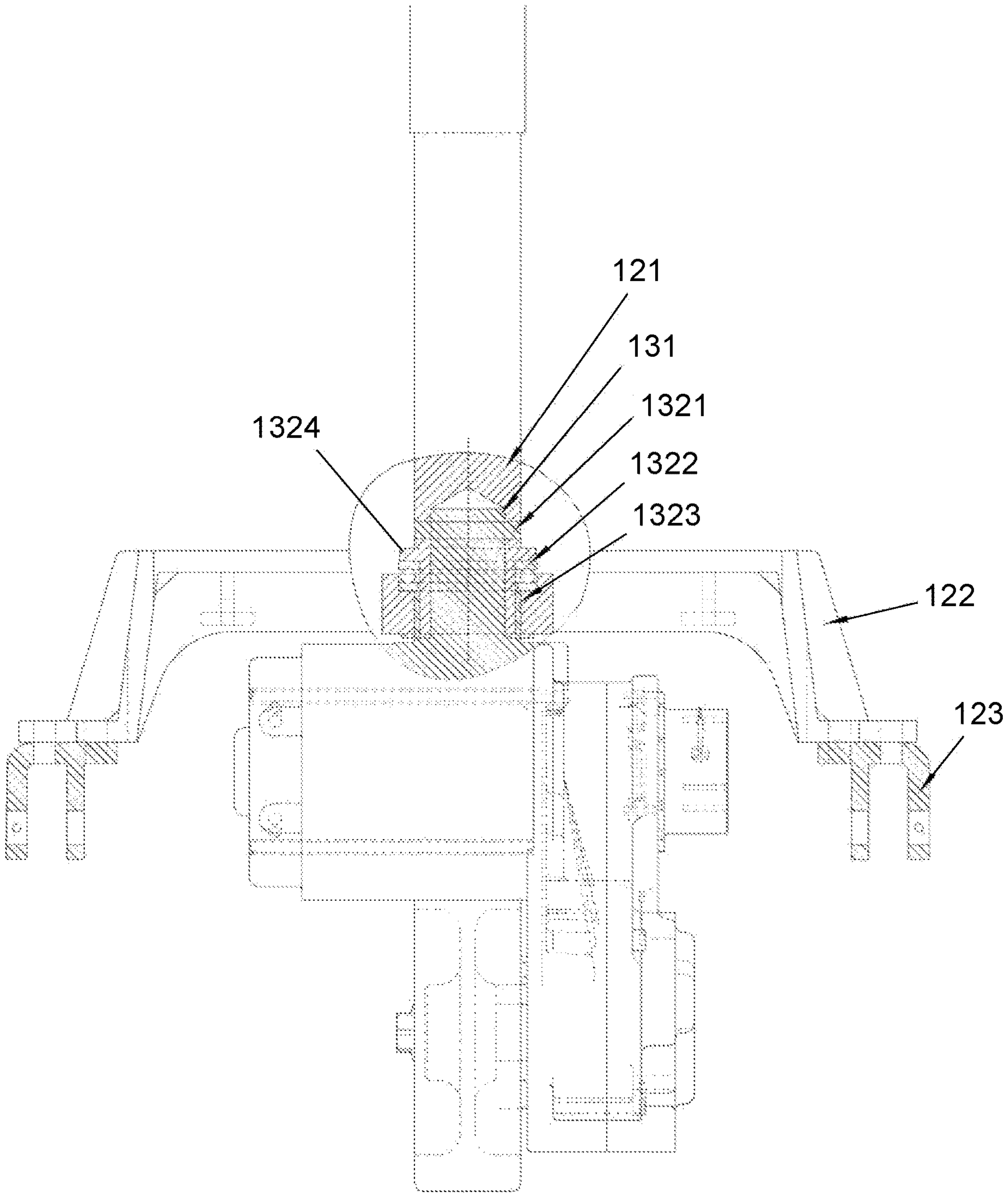
FIG. 17 is a partial cross-sectional schematic diagram of the internal connection between an oil cylinder and a shaft head end of a driving assembly according to the embodiment of FIG. 8.

The handle joint base 14 is connected to the hydraulic component 12 and the hydraulic component 12 includes an oil cylinder 121, seen in FIGS. 8 and 17. The bearing component includes a bearing bridge 122 and bridge lugs 123. Both ends of the bearing bridge 122 are detachably connected with the bridge lugs 123, respectively. The middle part of the bearing bridge 122 is sleeved on the oil cylinder 121 and is rotatable relative to the oil cylinder 121. The oil cylinder 121 is fixedly connected with the top shaft head end 131 of the driving assembly 13 through a pin shaft 1321.

The top of the hydraulic component 12 is removably installed on the front frame 2, and the connecting arms 231 of the connecting rod wheel component 23 are removably connected to the bridge lugs 123, respectively. The frame body 26 is L-shaped with respect to having forward extending forks of known construction, and the structure need not be described in further detail. Advantages of the example carriers of the present disclosure are provided by the technical scheme of the combination of the modularly assembled front frame 2 and rear frame 1, which are assembled to each other after shipping of the vehicle, compared to existing carriers that are fully assembled during manufacturing and prior to shipping. The present carriers are constructed as pallet trucks and to be more conveniently and quickly assembled, compact in structure, environmentally friendly, suitable for small tonnage transportation, and low in cost.

Figure 11:
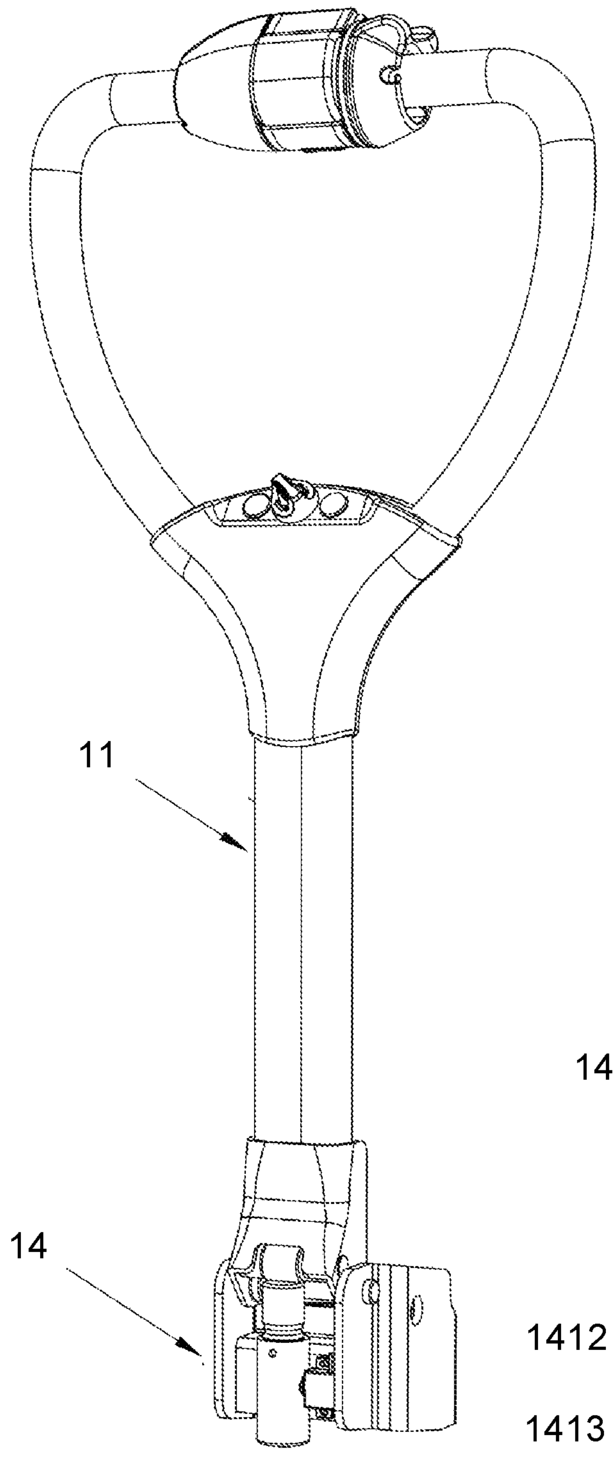
FIG. 11 is a rear perspective structural schematic diagram of an operating handle and a handle joint base according to the embodiment of FIG. 1.
Figure 12:
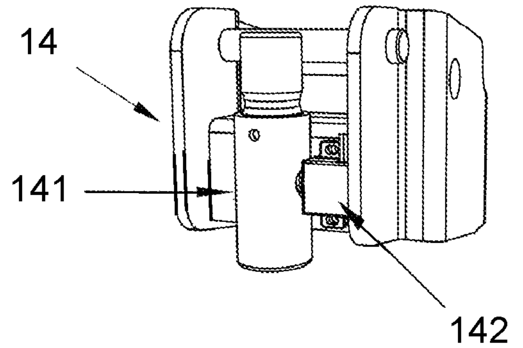
FIG. 12 is a rear perspective structural schematic diagram of a handle joint base according to the embodiment of FIG. 11.

Specifically, the operating handle 11 can be connected with the signal of the controller 133. The operating handle 11 is provided with a speed adjusting key and a lifting button. The lifting state of the hydraulic component 12 is controlled by pressing the lifting button, and the running speed of the carrier is controlled by rotating or pressing the speed adjusting key. As seen in FIG. 11, the operating handle 11 is hinged to the handle joint base 14 and is rotatable relative to the handle joint base 14. The trigger part of the trigger component 141 is movable relative to the joint fixing base 1413. The microswitch 142 comprises a contact capable of triggering to be turned on or off. Part of the surface of the contact is exposed outside the housing of the microswitch 142, and the surface of at least the exposed part is an arc-shaped surface.

Figure 13:
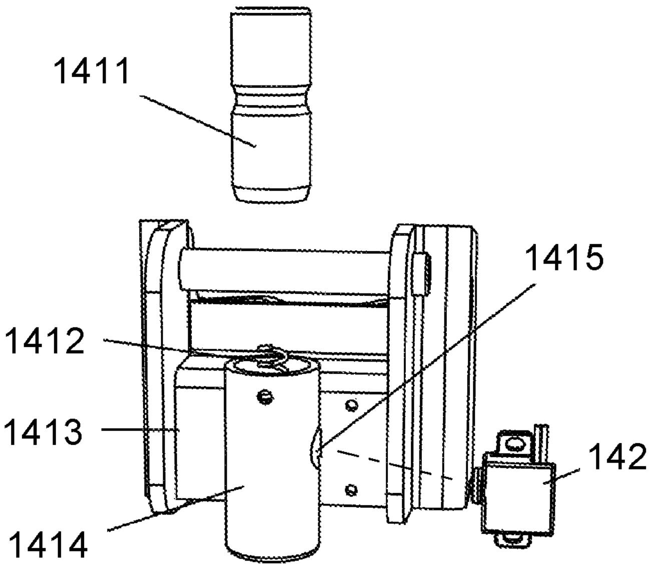
FIG. 13 is an exploded rear perspective structural schematic diagram of the handle joint base according to the embodiment of FIG. 12.
Figure 14:
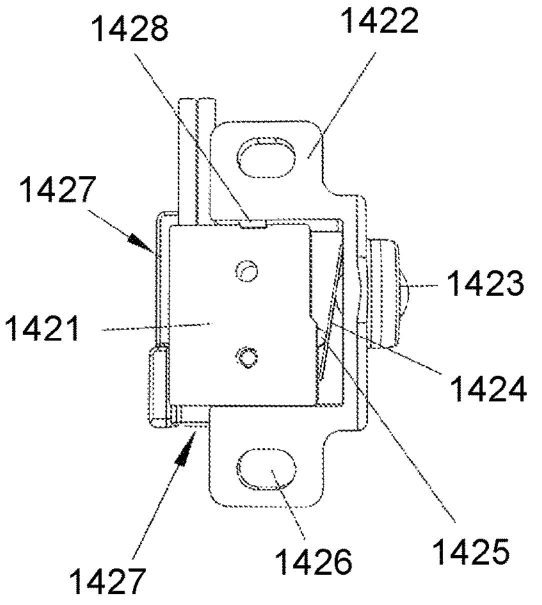
FIG. 14 is a structural schematic diagram of a microswitch according to the embodiment of FIG. 11.
Figure 15:
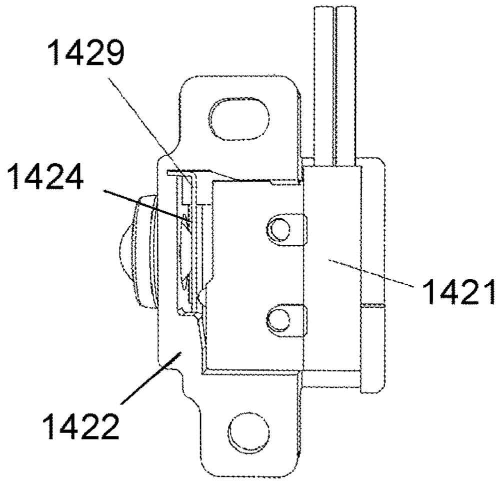
FIG. 15 is a structural schematic diagram of another microswitch according to the embodiment of FIG. 11.

As seen in FIG. 13, the outer wall surface of the first of the trigger part is a wedge-shaped surface matched with the arc-shaped surface of the exposed part of the microswitch. The trigger part is driven to move by the rotation of the operating handle 11 upward or downward and urges the wedge-shaped outer wall surface of the first end of the trigger part to abut and force against the arc-shaped surface, driving the contact to move into the housing of the microswitch to trigger the microswitch to be turned on or off. In the above scheme, only the surface of the exposed part of the microswitch is required to be an arc-shaped surface. In other words, the unexposed part can be a cylinder 94 structure, an arc-shaped body structure or other structures. The purpose of the arc-shaped surface of the microswitch contact is to allow the trigger part to smoothly press the contact at any angle, and so as not to be stuck.

Further, as a preferred scheme, the trigger part is rotatable along its axis. As previously noted, the outer wall surface of the first end of the trigger part is a wedge-shaped surface. The trigger part rotates to accommodate any directional angle of the operating handle 11, and its wedge-shaped surface at the first end abuts the arc-shaped surface of the contact. This scheme optimizes use of the wedge-shaped surface of the trigger part. In the above scheme, part of the trigger part may have a wedge-shaped surface, that is, the outer wall surface of the first end of the trigger part opposite to the arc-shaped surface of the contact is a wedge-shaped surface. However, other parts may not have a wedge-shaped surface. If only part of the trigger part is a wedge-shaped surface, the trigger part cannot rotate along its own axis. However, given the wedge-shaped surface around the entire first end of the trigger part in this scheme, even after the trigger part rotates at any angle along its own axis, it can still abut and press the contact.

Turning to FIGS. 12-15, the microswitch 142 further comprises a switch 1421 and an interlocking base 1422. The interlocking base 1422 is detachably connected to the outside of the switch 1421. The interlocking base 1422 is provided with a contact channel. The contact is a ball 1423. The ball 1423 is movably installed in the contact channel. The outlet diameter of the contact channel is smaller than the maximum diameter of the ball 1423 and is capable of limiting the ball 1423 from being separated from the interlocking base 1422 as a whole.

The switch 1421 is further provided with a pressing plunger 1425, and a plectrum 1424 is provided between the ball 1423 and the pressing plunger 1425. The pressing plunger 1425 is indirectly pressed by pressing the ball 1423 to trigger the switch 1421. The advantage of implementing the contact as a ball 1423 is that even if the contact rolls arbitrarily in the contact channel, the surface exposed outside the housing of the microswitch 142 always is an arc-shaped surface, which does not affect triggering of the microswitch 142. On the one hand, the function of the plectrum 1424 can support the ball 1423 to limit the ball 1423 from falling out of the contact channel. On the other hand, by using the lever principle, the pressing plunger 1425 is pressed to trigger the switch 1421 after the ball 1423 is pressed inward. When the ball 1423 is not pressed, the plectrum 1424 is reset by returning to a rest position.

In a further optimized scheme, the inner side wall of the interlocking base 1422 is provided with a clamping groove 1429, and one end of the plectrum 1424 is embeddable in the clamping groove 1429 so that the plectrum 1424 is positioned between the ball 1423 and the pressing plunger 1425, and the inward part of the ball abuts against the plectrum 1424. When the ball 1423 is pressed, the whole plectrum 1424 elastically deforms or deflects to the switch side, and the other end of the plectrum 1424 presses down on the pressing plunger 1425 to trigger the switch 1421. After no longer pressing, the plectrum 1424 returns to its original state.

The advantage of fixing one end of the plectrum 1424 through the clamping groove 1429 is that it is easy to assemble and repair and replace the plectrum 1424. Because the elastic deformation or deflection recovery ability of the plectrum 1424 will become weak after being pressed and deflected for a long time and many times, it is convenient to be able to easily replace a worn plectrum 1424. Of course, this embodiment further provides another arrangement scheme of the plectrum 1424, that is, a section of the plectrum 1424 may be fixedly and obliquely provided on the end face of the switch 1421, and forms an acute included angle with the end face of the switch 1421. The pressing plunger 1425 is located in the included angle, and the other end of the plectrum 1424 abuts against the ball 1423.

In this embodiment, the trigger component 141 comprises a fixed shaft cylinder 1414 and a trigger shaft body 1411, wherein the trigger shaft body 1411 is the trigger part, the fixed shaft cylinder 1414 is fixedly connected to the joint fixed base 1413 and is located at the side where the contact of the microswitch 142 is located. A first end of the trigger shaft body 1411 is inserted into the fixed shaft cylinder 1414 and is movable up and down along its axis. The fixed shaft cylinder 1414 is provided with a through hole 1415, and the exposed surface of the contact is located in the fixed shaft cylinder 1414 through the through hole 1415 and abuts against the wedge-shaped surface at the first end of the trigger shaft body 1411. The inner bottom of the fixed shaft cylinder 1414 is provided with a resilient member 1412, and the other end of the resilient member 1412 engages the top of the trigger shaft body 1411. The resilient member 1412 in this example is a spring. The spring enables the trigger shaft body 1411 to be reset after being forced downward, and the spring also prevents the trigger shaft body 1411 from being separated from the fixed shaft cylinder 1414 when being reset.

One end of the side wall of the interlocking base 1422 is provided with a protrusion to form a U-shaped clamping wall, and the other end of the interlocking base protrudes to form a limiting block. The contact channel is provided on the U-shaped clamping wall, and gaps or avoidance spaces 1427 are at both ends of the U-shaped clamping wall and the limiting block, respectively. A clamping area enclosed by the U-shaped clamping wall and the limiting block is used for clamping and fixing the position of the switch 1421. A protrusion of an inner side of the U-shaped clamping wall forms a positioning step surface 1428 for preventing the switch 1421 from being separated from the clamping area.

The avoidance space 1427 is provided to allow the switch 1421 to deform slightly during pressing and placing, until the switch 1421 is placed in the clamping area, and the U-shaped clamping wall and the limiting block resume deformation. The avoidance space 1427 is used for switching the output signal line channel, so as to better clamp and fix the switch 1421 and prevent separation. The positioning step surface 1428 is provided to further optimize the clamping and fixing effect. The side wall located in the clamping area is provided with an upright post for guiding the switch 1421 to be installed in the clamping area, and the switch 1421 is provided with a guide groove matched with the upright post. Both ends of the U-shaped clamping wall extend outward to form connecting lugs, respectively, and the connecting lugs are provided with abutting holes 1426.

Figure 9:
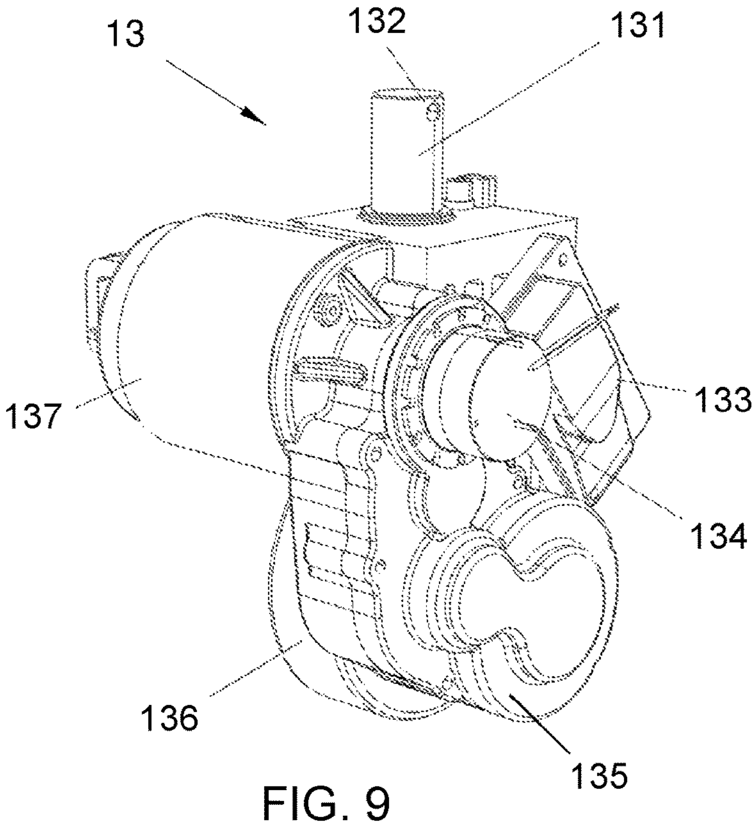
FIG. 9 is a front perspective structural schematic diagram of the driving assembly according to the embodiment of FIG. 8.

In this embodiment, as will be appreciated in FIGS. 8 and 9, the shaft head end 131 at the top of the driving assembly 13 can be inserted vertically into the bottom of the oil cylinder 121. The bottom end of the oil cylinder 121 is provided with a radially opposite pin hole, and the shaft head end 131 is provided with a passage hole 132. After the shaft head end 131 is inserted into the bottom of the oil cylinder

121, the pin hole and the passage hole 132 are located on the same axis to form a locking channel. A pin shaft 1321 is transversely inserted from one end of the locking channel until it completely penetrates into the locking channel, and the driving assembly 13 is fixedly connected to the oil cylinder 121. This may be seen in FIGS. 8 and 17.

In known existing carriers, an oil cylinder and the top of a driving assembly 13 generally are integrated or screwed together to be connected by bolts, which has disadvantages. The integrated formation makes it difficult to manufacture the oil cylinder 121 and the driving assembly 13, while the manner of being connected together by installing bolts is cumbersome, time-consuming and laborious in assembly.

According to the technical scheme of the present disclosure, the pin shaft 1321 is connected to the oil cylinder 121 and shaft head end 131, providing improved assembly efficiency, and time and labor are saved while ensuring the connection strength and stability. In addition, the middle of the bearing component is sleeved at the bottom end of the oil cylinder 121, and the bearing component is movable relative to the axis of the oil cylinder 121. The middle of the bearing bridge 122 is provided with a bearing base. In this embodiment, the bearing base is integrally formed with the bearing bridge 122, while in other embodiments, the bearing base may be fixedly connected to the bearing bridge 122.

As seen in FIG. 17, the bottom end of the oil cylinder 121 penetrates through the inner ring of the bearing base. The bearing base provided has the advantage that it can make the oil cylinder 121 and the driving assembly 13 rotate smoothly along its axis. In this embodiment, the inner ring of the bearing base is provided with a self-lubricating bearing 1323, and the inner ring of the self-lubricating bearing 1323 is sleeved on the outer wall surface of the bottom end of the oil cylinder 121. A thrust ball bearing 1322 is installed above the bearing base. The thrust ball bearing 1322 is located on the same axis as the bearing base. The thrust ball bearing 1322 is sleeved on the oil cylinder 121. A retaining ring 1324 is provided on the outer wall of the oil cylinder 121, and the thrust ball bearing 1322 is clamped between the retaining ring 1324 and the bearing base. The advantage of adding the thrust ball bearing 1322 is to help the vehicle to turn more smoothly, and the advantage of adding the self-lubricating bearing 1323 is to be a guide on the one hand and to help the frame body 26 of the front frame 2 turn relative to the rear frame 1, on the other hand. The retaining ring 1324 can better fix and clamp the thrust ball bearing 1322 to prevent the thrust ball bearing 1322 from disengaging.

A connecting shaft is provided at the top of the box body 139, which is the shaft head end 131. Of course, in alternative embodiments, the load-bearing bridge 122 and each bridge lug 123 may be integrally provided, whether integrally formed with the load-bearing bridge or connected thereto to form an integral assembly. An advantage of the present embodiment is that each lug 123 is detachable and the integral lugs make it convenient to assemble the front frame 2 and the rear frame 1. If the lugs are integrally provided, the ease of assembly of the whole vehicle is improved. Each bridge lug 123 has a U-shaped structure. A connecting hole is formed at the closed end of the bridge lug 123, and an installation hole corresponding to the connecting hole through the bridge is formed at each end of the bearing bridge 122. The bridge lug 123 is connected and fixed to the bearing bridge 122 by installation of bolts penetrating through the connecting holes and the installing holes.

Figure 7:
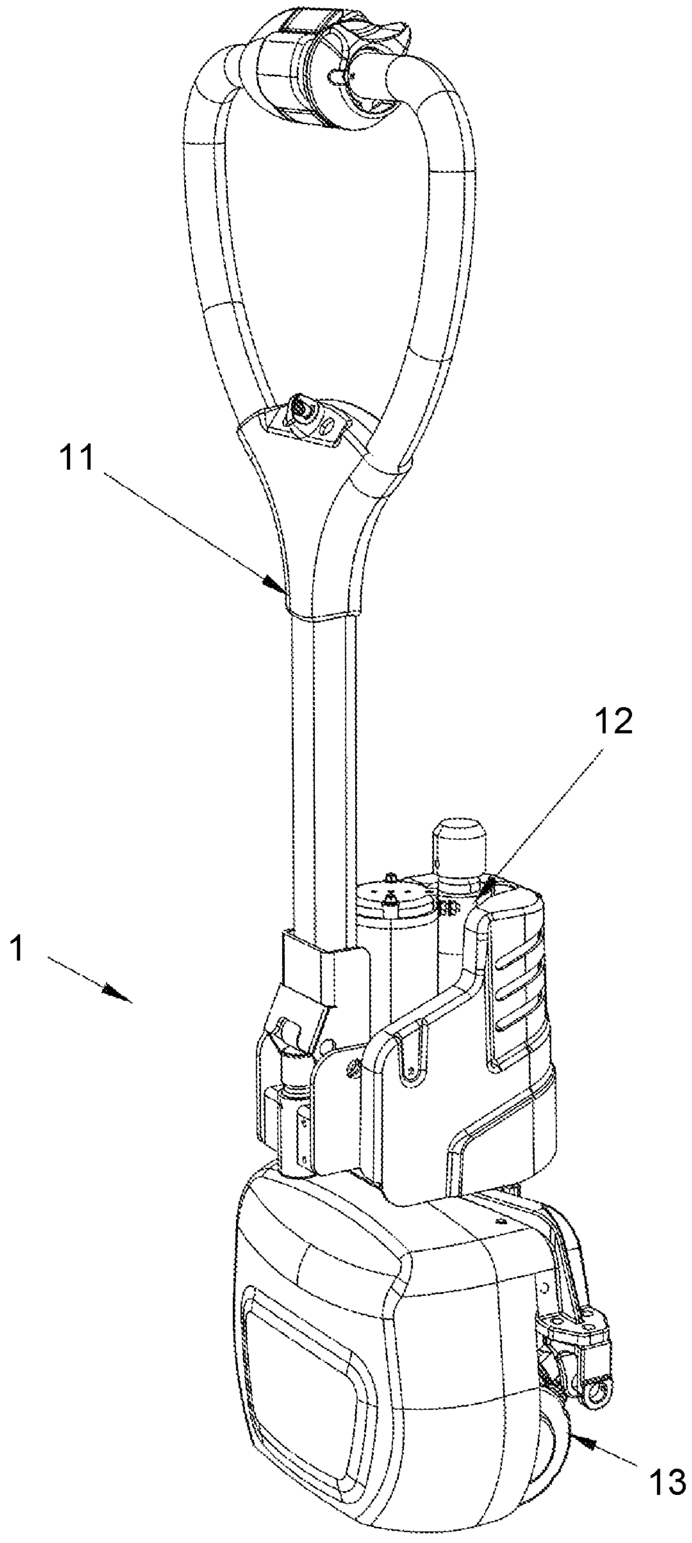
FIG. 7 is a structural schematic diagram of a rear frame according to the carrier embodiment of FIG. 1.
Figure 18:
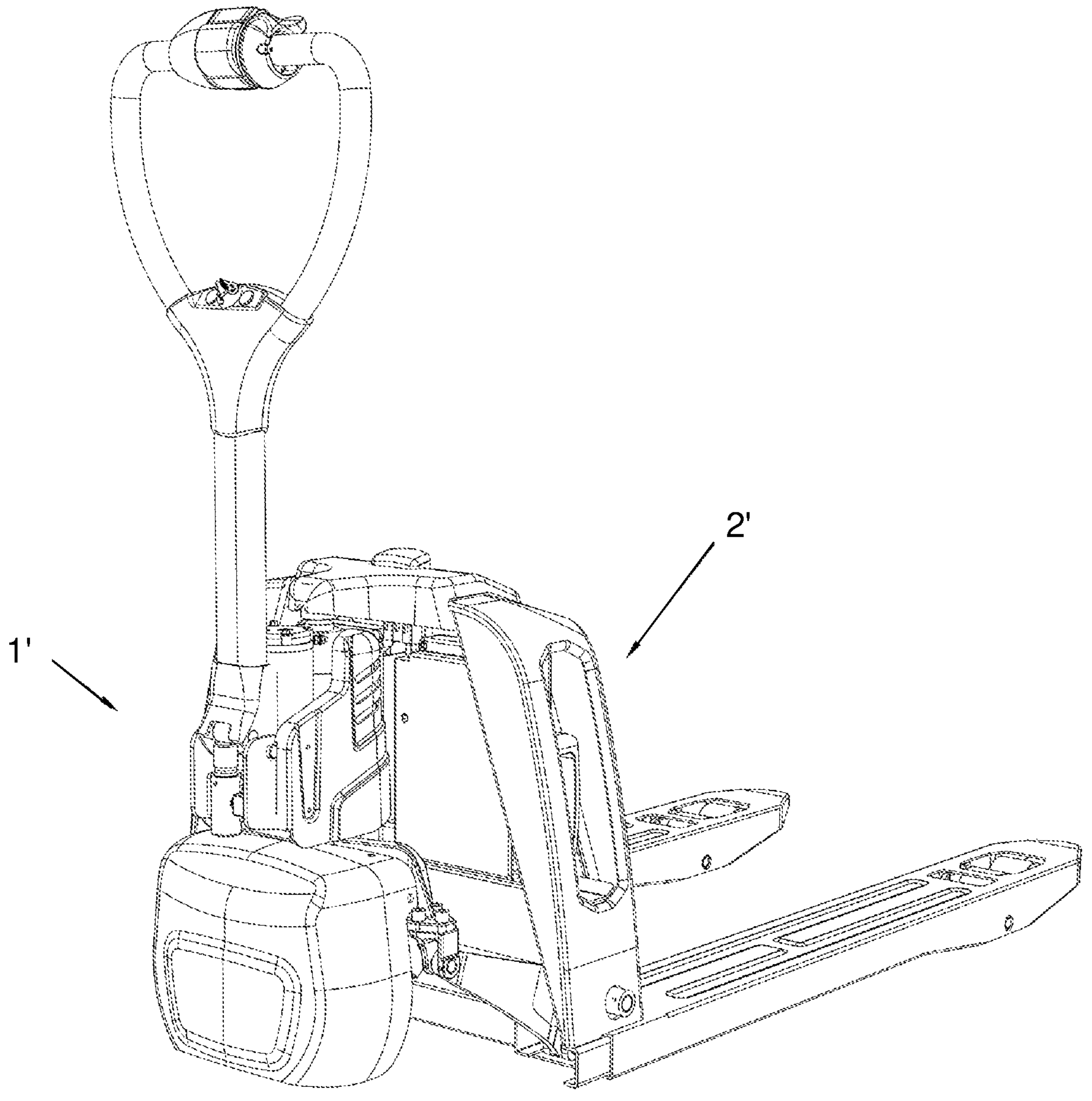
FIG. 18 is a rear perspective structural schematic diagram of a second embodiment of a carrier of the present disclosure in a configuration of a pallet truck vehicle equipped with double batteries.
Figure 19:
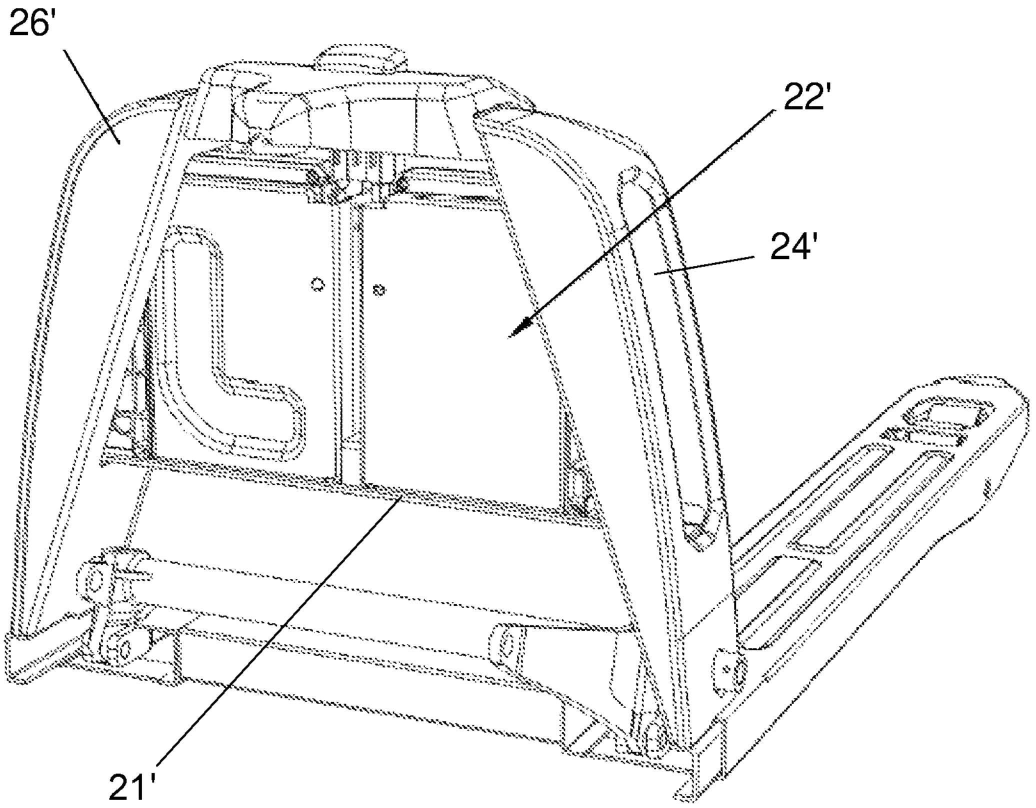
FIG. 19 is a rear perspective structural schematic diagram of a front frame including two batteries according to the embodiment of FIG. 18.
Figure 20:
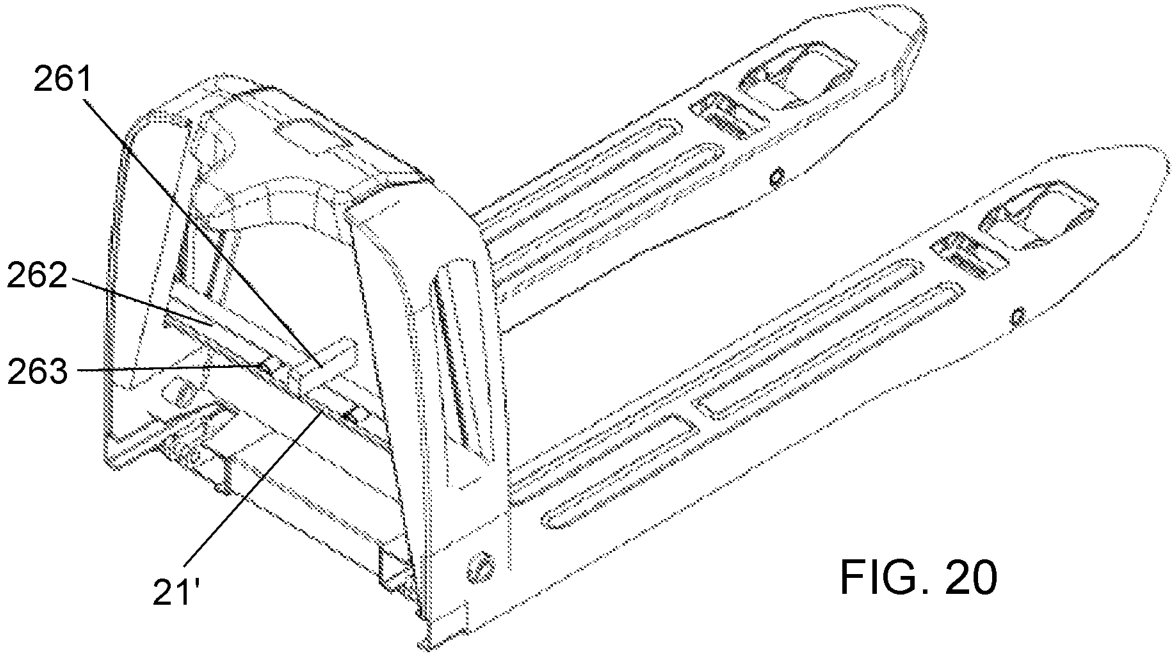
FIG. 20 is a rear perspective structural schematic diagram of a front frame according to the embodiment of FIG. 18.
Figure 21:
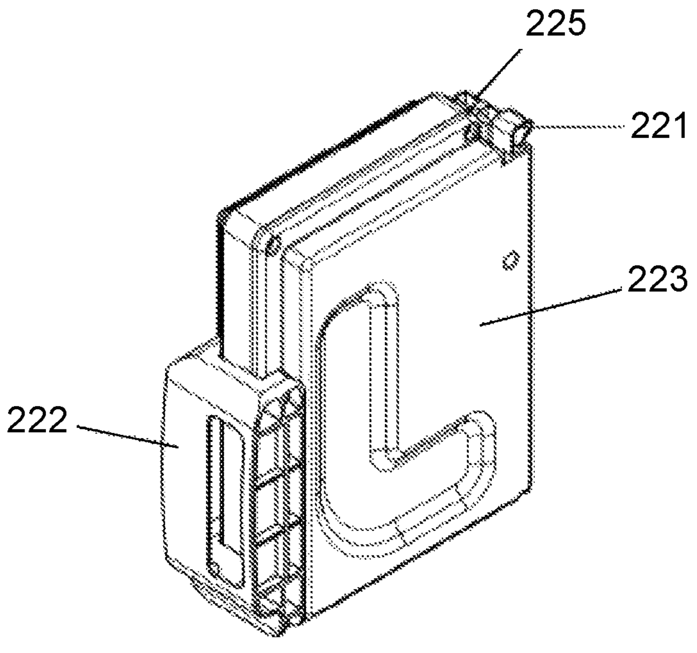
FIG. 21 is a rear perspective structural schematic diagram of a battery according to the embodiment of FIG. 18.

The driving assembly 13, the hydraulic component 12 and the bearing component may form a driving connection structure, which improves the assembly efficiency. The hydraulic component 12 further comprises a push rod, the oil cylinder 121 is sleeved outside the rod body of the push rod, the push rod can lift along its axis relative to the oil cylinder 121, and the top of the push rod, such as may be seen in FIGS. 7 and 8, is detachably connected to the front frame 2, as seen in FIGS. 1 and 18, and is rotatable circumferentially along the axis of the push rod and oil cylinder 121.

Figure 10:
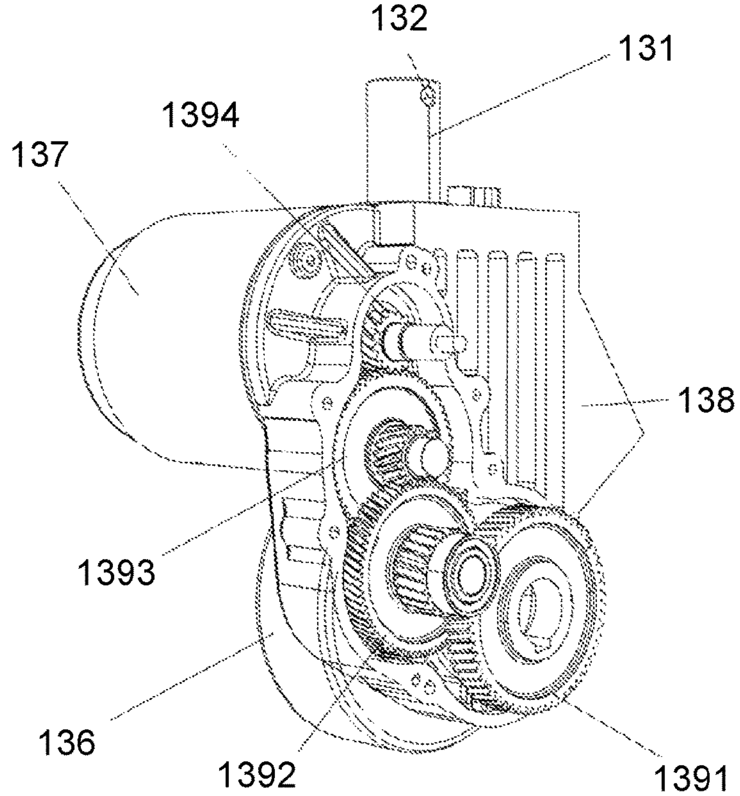
FIG. 10 is a front perspective structural schematic diagram of an internal structure of the driving assembly according to the embodiment of FIG. 9.

In order to make the carrier lightweight and easy to assemble, as seen in FIGS. 8-10, in this embodiment, the driving assembly 13 comprises a box body 139, a driving motor 137, a driving wheel component 136 and a controller 133. The driving wheel component 136 and the driving motor 137 are both installed on the box body 139. The output shaft of the driving motor 137 indirectly drives the driving wheel component 136 to rotate through meshing of gear sets.

The controller 133 is detachably connected to the box body 139 and located on the side wall near the top of the box body 139. The controller 133 is connected with a driving motor circuit 137. In an innovative manner, the controller 133 also is integrated and installed on the box body 139. The advantage of this design is that, on the one hand, there is no need to add another structure in the frame body 26 of the front frame 2 for specially installing the controller 133. This reduces the weight of the frame body 26, facilitates easier processing and manufacturing of the frame body, reduces complexity and lightens the structural design of the frame body 26. On the other hand, since the controller 133 also is installed on the box body 139, the distance between the controller 133 and the driving motor 137 is closer, so that the electrical cable connection (not shown for convenience in viewing the structures) does not need to be long. This is convenient and provides for better electrical wiring management, and avoids the occurrence of cable disorder, electrical wiring interference or crosstalk and the like.

In addition, as mentioned above, the controller 133 is located on the side wall at the top of the box body 139, in a position spaced some distance from the ground. This ensures that road impurities or puddles are not easy to splash and hit the controller 133 during the running of the carrier, This protects the controller 133 and makes it more difficult to damage the controller 133. Specifically, the side wall of the top of the box body 139 is provided with an installation area 138 for installing the controller 133. The installation area 138 is inclined and provided with a plurality of installation holes. The controller 133 is provided with a plurality of connection holes corresponding to the installation holes, and the controller 133 is connected and fixed on the installation area 138 by screws penetrating through and abutting against the connection holes and the installation holes. An installation area 138 is provided, which prompts the installer to install the controller 133 in the designated area more conveniently and quickly, and helps to standardize the assembly process. In addition, in some embodiments, the installation area 138 may be a raised surface of the box body 139 or a recessed surface of the box body 139. With such designs, the position of the installation area 138 may be highlighted or more apparent, and the controller 133 may be better positioned. This advantageously helps to further optimize the speed of vehicle assembly.

The driving wheel component 136 is provided on the side wall near the bottom end of the box body 139. The driving motor 137 is provided on the side wall of the box body 139 on the same side as and positioned above the driving wheel component 136. In this embodiment, both the driving motor 137 and the driving wheel component 136 are located on the side wall of the box body 139 opposite to the controller 133. The manner in which the driving motor 137 is located above the driving wheel component 136 is similar to the effect of having the controller 133 installed at the top of the box body 139, which is to also ensure that the driving motor 137 is located at a height from the ground, so as to prevent the driving motor 137 from being damaged due to poor road conditions.

The wheel body of the driving wheel component 136 needs to contact the ground. In addition, as seen in FIG. 10, the gear set comprises a first gear 1394, a second gear 1393, a third gear 1392 and a fourth gear 1391 which are sequentially meshed and connected in parallel. The first gear 1394 is sleeved on the output shaft of the driving motor 137, and the fourth gear 1391 is sleeved on the output shaft of the driving wheel component 136. The second gear 1393 and the third gear 1392 are both rotatably provided in the box body 139. Meshing in parallel should be understood as a plurality of gears meshing with each other in a horizontal state. The advantage of meshing and connecting in parallel is that it can reduce the volume of the carrier, make the structure more compact and have better linkage or gear reduction effect.

In this embodiment, in order to reduce the noise caused by driving, the first gear 1394, the second gear 1393, the third gear 1392, and the fourth gear 1391 are meshed in oblique teeth in sequence. Meshing in oblique teeth here should be understood to be different from meshing in parallel. Meshing in oblique teeth is a tooth-to-tooth meshing mode, which is meshed and linked by oblique teeth. The advantage of meshing in oblique teeth is that it can effectively reduce the noise caused during rotation. The second gear 1393 comprises a first driving gear and a first driven gear, which are coaxially provided. The third gear 1392 has a similar structure to the second gear 1393. The second gear 1393 comprises a second driving gear and a second driven gear. The first driving gear of the second gear 1393 is meshed with the first gear 1394. The first driven gear of second gear 1393 is meshed with the second driving gear of third gear 1392. The second driven gear of the third gear 1392 is meshed with the fourth gear 1391.

The driving assembly 13 further comprises a box cover 135, best seen in FIGS. 8 and 9. The box cover 135 can be detachably connected to the box body 139 and at least cover the gear set. The box cover 135 can effectively protect the gear set from being damaged by gravel and other impurities during rotation. The driving assembly 13 further comprises a brake 134 for controlling the rotational speed of the driving motor 137. The brake 134 is connected to the output end of the driving motor 137 to effectively control the running speed of the driving wheel component 136.

Figure 3:
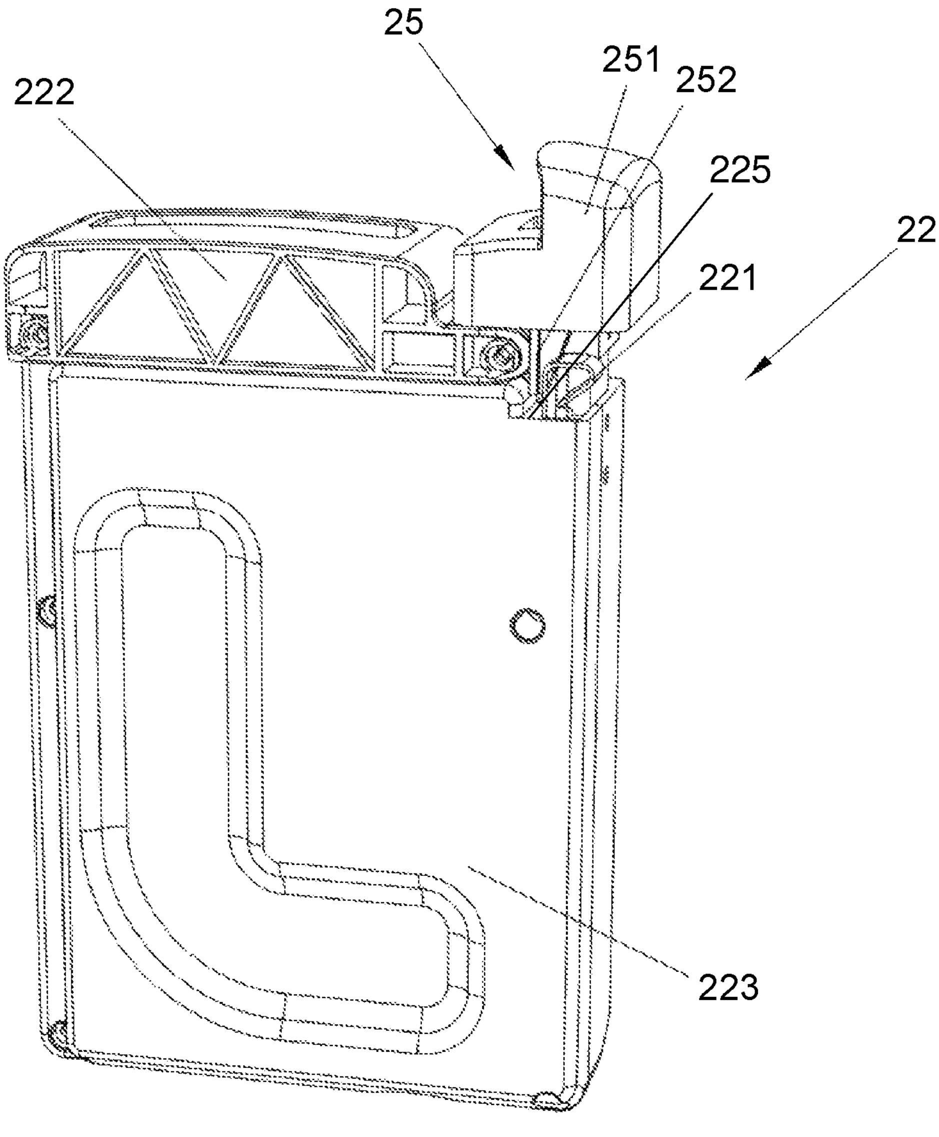
FIG. 3 is a perspective structural schematic diagram of one of the battery structures according to the embodiment of FIG. 1.
Figure 4:
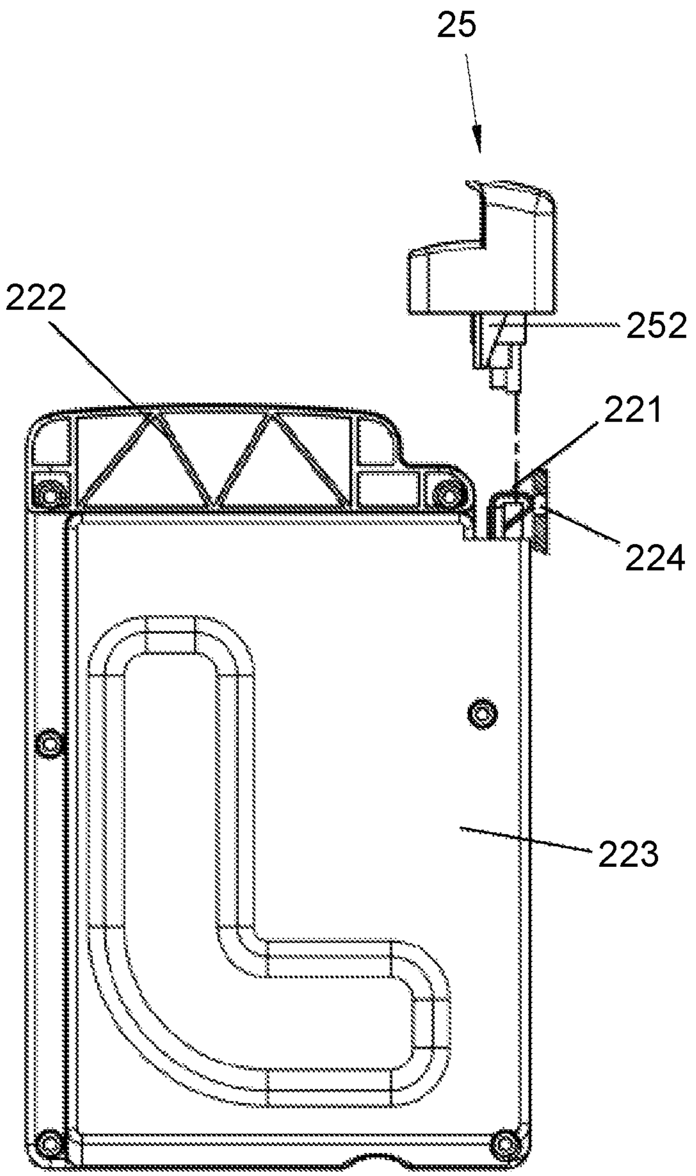
FIG. 4 is a structural schematic diagram of a pluggable component insertable into a battery main body according to the battery embodiment of FIG. 3.
Figure 5:
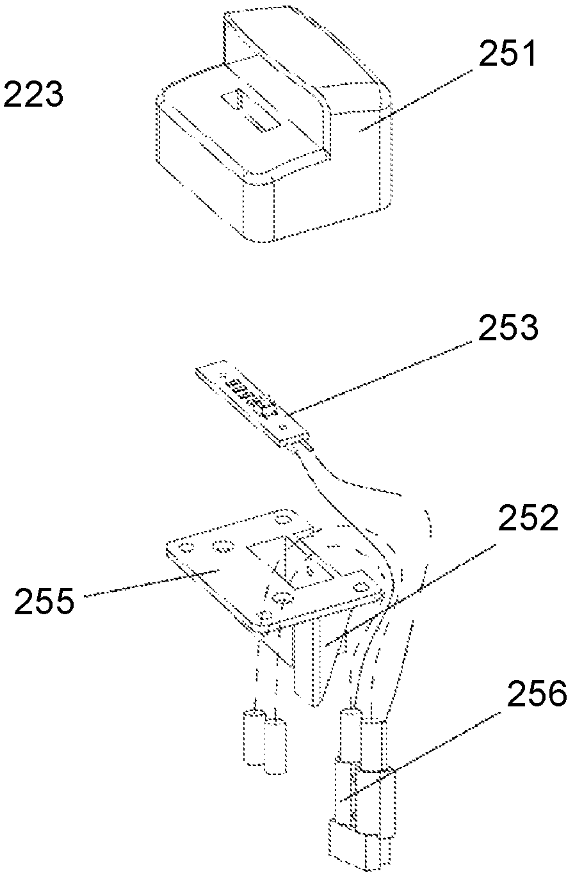
FIG. 5 is an exploded rear perspective structural schematic diagram of one of the pluggable components according to the battery embodiment of FIG. 3.

It should be noted that, as seen in FIGS. 3 and 4, in this embodiment, one end of the top of the battery main body 223 is provided with a fixedly mounted, deflectable or elastically deformable bar 221, which has a bent configuration at its upper end. A gap exists between the elastically deformable bar 221 and the central portion of the rest of the top of the battery main body 223. A pluggable component 25 includes an inclined guide block 253. When the pluggable component 25 is plugged into the battery main body 223, the inclined guide block 252 is inserted into the gap, and the inclined surface of the inclined guide block 252 abuts and applies force against elastically deformable bar 221. This causes the end of the elastically deformable bar 221 to deflect outward.

A cross section of the bottom of the battery main body 223 is V-shaped, and a positioning groove that is recessed inward is formed at the bottom of the battery main body 223. The pluggable component 25 comprises a holding member 251 for gripping, a pluggable bracket 255 and at least one connector. The holding member 251 is installed on the top of the pluggable bracket 255, and the connector is installed on a side of the pluggable bracket 255. The connector has a pluggable end that can be plugged into and abutted with a socket 225 of the battery main body 223. A top of the holding member 251 includes an integrally formed U-shaped handle which is convenient for grasping, holding and inserting the pluggable component 25.

Figure 22:
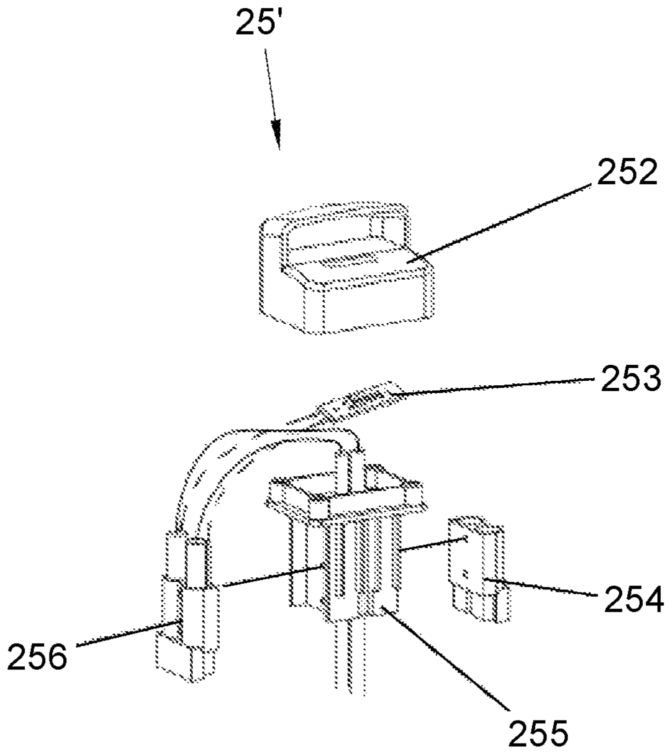
FIG. 22 is an exploded perspective structural schematic diagram of a pluggable component according to the embodiment of FIG. 18.

The main function of the pluggable component 25 is that there is an electrical cable or wiring in the pluggable component, which provides power for the whole vehicle operation once the connector is plugged into the socket 225 of the battery main body 223 and the cable is further connects to the controller 133. In addition, the pluggable component 25 may be provided in another configuration having two connectors, one as a main connector 256 and the other as a sub-connector 254, as seen in FIG. 22. In the second embodiment, a pluggable component 25', a passage between the main connector 256 and the pluggable bracket 255 may be loaded with power lines, such that only the battery main body 223 connected with the main connector 256 can supply power to the vehicle, while the battery main body 223 connected with the sub-connector 254 does not supply power, as the sub-connector 254 is usable only for connection to standby power storage via the second battery main body 223 inserted into the sub-connector 254, as described further herein.

In this disclosure, according to the direction and structure of plugging and unplugging the battery, two different front frame 2 structures are provided. In the following description, a first scheme has the battery main body 223 vertically inserted into and installed on an installing guide rail 21 in the frame body 26, seen in FIGS. 2 and 6. Specifically, the vertically extending inner front side wall of the frame body 26 of the front frame 2 is provided with a U-shaped installing guide rail 21, and the top of the front frame 2 is provided with an opening 24. A handle 222, seen in FIGS. 3 and 4, is connected to the top of the battery main body 223. The battery main body 223 may be vertically inserted through the opening 24 to be installed on the guide rail 21, wherein both the handle 222 and the pluggable component 25 are located at the opening 24.

A side wall of the frame body 26 of the front frame 2 is provided with a frame limiting groove 224 (shown in isolation as a cross-section removed from the frame body 26 and adjacent the battery main body 223 in FIG. 4). When the battery main body 223 is inserted into the installing guide rail 21, the fixedly mounted elastically deformable bar 221 is positioned at the frame limiting groove 224. When the pluggable component 25 is plugged into the battery main body 223 and becomes electrified, the end part of the fixedly mounted elastically deformable bar 221 is deflected and moved into the frame limiting groove 224 to be in a locked position. This limits the battery main body 223 from moving upward and being separated from the installing guide rail 21.

In this technical scheme, the U-shaped installing guide rail 21 limits the downward movement and the left and right movements of the battery main body 223. However, bumps are inevitable when road or floor surface conditions are poor during the running of the carrier. So, the upward limit is needed to stably fix the battery main body 223 in the front frame 2. Therefore, the pluggable component 25 is provided so that the inclined surface of the inclined guide block 252 abuts against and apples force against the elastically deformable bar 221, so that an upper end of the elastically deformable bar 221 deflects outward and is forced into the frame limiting groove 224 to be locked in position and to limit the battery main body 223 from moving upward and being separated from the installing guide rail 21. This ensures that the battery main body 223 will remain installed in the front frame 2.

In this embodiment, the upper end of the fixedly mounted elastically deformable bar 221 has a triangular bent flag-shaped structure, and the outward extending tip of the elastically deformable bar 221 faces the frame limiting groove 224 in the frame body 26. When the inclined guide block 252 is not plugged into the gap 225, the elastically deformable bar 221 may move out of the limiting groove 224 and resume a rest or reset position. The operator can pull out the pluggable component 25 by holding the U-shaped handle and pull out the battery main body 223 vertically by holding the handle 222. In this technical scheme, since the battery is inserted vertically, only one battery structure 22 can be placed in the front frame 2 due to the limited internal space of the frame body 26 and the volume of the battery main body 223 itself.

Another technical scheme is provided in a further embodiment of a carrier shown in FIGS. 18-22, wherein two identical battery structures 22' are transversely inserted into and installed on an installing guide rail 21' in the frame body 26'. Specifically, a transverse installing guide rail 21' is provided on the vertically extending inner front side wall of the frame body 26' of the front frame 2'. Two opposite sides of the frame body 26' are provided with an opening 24', respectively. A handle 221 is connected and fixed to a side of each battery main body 223, and the two battery structures 22' are moved transversely through the two openings 24' to the installing guide rail 21' in the front frame 2' for fixation, respectively. The upper surface of the installing guide rail 21' receives the V-shaped concave structure on the bottom of each battery main body 223.

The top of the front frame 2' is provided with an installing channel. The pluggable component 25' in this embodiment is vertically installed through the installing channel and is plugged into and becomes electrified with the tops of the two battery main bodies 223, at the same time. The pluggable component 25' is provided with two connectors, one as the main connector 256 and the other as the sub-connector 254, but only the main connector 256 is provided with electrical wiring. Therefore, when the main connector 256 is plugged into one of the battery main bodies 223, the battery main body 223 provides power supply first, while the other battery main body 223 inserted into the sub-connector 254 acts as a standby power storage.

In addition, in this alternative embodiment, the guide inclined block 252 is eliminated because the two battery structures 22' can be fixedly installed in the front frame 2' through the previously described installation structure of this embodiment. The vertically extending inner front side wall of the front frame 2' includes a rearward extending limit stopper 261. The limit stopper 261 is located in the middle of the installing guide rail 21' and divides the installing guide rail 21' into two installation areas 262 evenly, and a resilient tab 263 is symmetrically provided on the installing guide rail 21' in each installation area 262. When a battery main body 223 moves transversely, the resilient tab 263 is deformed and eventually reaches the positioning groove in the bottom of the battery main body 223 to lock the battery main body 223 in an installed position.

Compared with the vertical insertion technical scheme, this transverse insertion scheme can be provided with two battery structures 22', which has an advantage of providing a longer run life cycle time, reducing the likelihood that the vehicle cannot be used due to failure of a battery or a charger, and ensuring the continuity of operation. Double batteries can be helpful in a work environment far away from a charging location when both are installed in the vehicle. Different battery loading schemes can meet the requirements of different vehicles for the battery structure 22'. After the battery of the main connector 256 is exhausted, the main connector 256 can be inserted into another battery main body 223 for standby power storage to continue running, so as to improve the endurance. In this embodiment, two battery main bodies 223 are installed on the front frame. In actual use, one may elect to only install one battery main body 223, depending on the demands of users themselves.

In addition, in this technical scheme, the pluggable component 25' further comprises an indicator light 253 for displaying the power of the battery main body 223, and the indicator light 253 that is used to monitor and indicate the operating condition and the remaining battery power in the electrified state.

Figure 23:
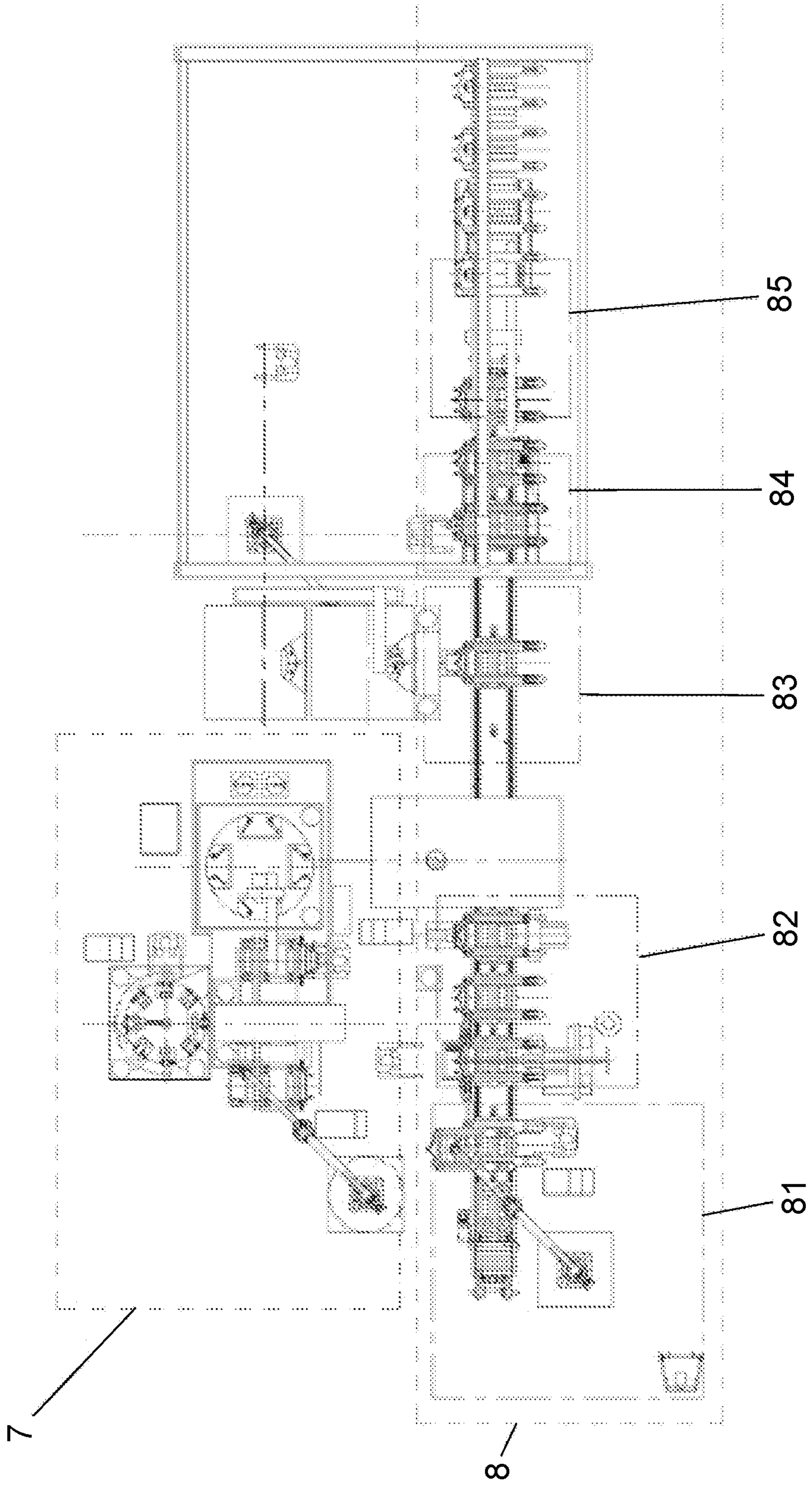
FIG. 23 is a schematic diagram of an assembly line for assembling a carrier of FIGS. 1 and 18.

An embodiment of an assembly line for a previously described carrier also is provided in the present disclosure, as schematically shown in FIG. 23. The assembly line embodiment provides an assembly method for assembling the carrier of the first embodiment. The assembly method comprises a first assembly line 8 for assembling the front frame 2 and a second assembly line for assembling the rear frame 1. The first assembly line 8 comprises a loading station 81, an assembling station 82, a welding station 83, a painting repair station 84, a turning station 85 and a packing station which are conveyed by a conveyor belt in sequence. The loading station 81 is provided with a hanging chain for transporting and manufacturing the molded frame body 26, a camera and a six-axis manipulator for grabbing the frame body 26 from the hanging chain and placing it on the conveyor belt. The assembling station 82 is provided with a positioning laser and an air cylinder. The welding station 83 is provided with a welding machine. The painting repair station 84 is provided with a painting repair spray gun. The turning station 85 is provided with a turning and shifting machine. The packing station is provided with a packer. The specific steps of the first assembly line 8 are as follows:

Step 1: Hanging the formed frame body 26 on the hanging chain, so as to be transported to a preset position of the first assembly line 8, grabbing the frame body 26 from the hanging chain by a six-axis manipulator, and placing it on a conveyor belt for transportation to the assembling station 82 by visual recognition of a camera, wherein at this time, the bottom of the frame body 26 faces upward, and the top thereof faces downward;

Step 2: clamping the pre-assembled connecting rod wheel component 23 to the assembling station 82 by clamping arms, installing the connecting rod wheel component 23 into the bottom of the frame body 26 by operators, positioning the first hinge hole between the connecting arm 231 and the frame body 26 and the second hinge hole between the wheel frame 232 and the frame body 26 by laser, and driving a pin shaft into the first hinge hole and the second hinge hole by air cylinders, respectively, so that the connecting rod wheel component 23 is connected and fixed to the frame body 26;

Step 3: clamping a sealing plate at the bottom of the frame body 26 by a manipulator, covering the sealing plate on the bottom of the frame body 26, and welding and positioning the sealing plate and the frame body 26 by a welding machine:

Step 4: carrying out painting repair on the frame body 26 by holding a painting repair spray gun by the operator:

Step 5: turning over the whole frame body 26 by 180 degrees by a turning and shifting machine, wherein at this time, the top of the frame body 26 faces upward, and the bottom thereof faces downward;

Step 6: packing the front frame 2 by a packer.

The second assembly line comprises an assembling station, a performance detection station and a packaging station. The assembling station is provided with a manipulator. The performance detection station is provided with a detection tool 9 seen in FIG. 24. The detection tool 9 carries out hydraulic jacking detection on the rear frame 1 and rolling detection of the driving assembly 13. The packaging station is provided with a packaging machine. The specific steps of the second assembly line are as follows:

Step 1: clamping the components of the rear frame 1 by a manipulator, respectively, and assembling the components by an operator to form a complete rear frame 1;

Step 2: installing the rear frame 1 on the detection tool 9, and carrying out hydraulic jacking detection and rolling detection of the drive assembly 13 to judge whether it is qualified or not;

Step 3: packing the rear frame 1 by a packaging machine.

The front frame 2 and the rear frame 1 are packed separately for knocked-down transportation. When a complete carrier needs to be assembled, the top of the hydraulic component 12 is connected to the top of the front frame 2, then each bridge lug 123 is detachably and rotatably connected to a corresponding connecting arm 231, and finally the battery structure 22 is installed. The carrier thus may be quickly and conveniently final assembled after delivery of the separate front frame 2 and rear frame 1.

The main innovation of this assembly method is that, on the one hand, the carrier is divided into two parts for synchronous assembly and separate packaging, which improves the production efficiency of assembly and is convenient and efficient when packing for transportation. On the other hand, it changes the assembly and sales mode of existing carriers, that is, in the process of assembly and sales, because existing carriers generally are assembled into a whole vehicle in factories, and then transported and sold in the form of a whole vehicle. In the present novel technical scheme, the front frame 2 and the rear frame 1 are assembled in a factory and are tested to be qualified in performance, respectively, and then are packed for sale. Thereafter, the buyer can assemble the two parts to form a whole vehicle, which is simple and quick to assemble. Of course, it also can be assembled into a whole vehicle in a factory and then sold. The above-mentioned six-axis manipulator, the hanging chain, and the turning and shifting machine are all existing technologies, the structures of which will not be described in detail.

In this embodiment of an assembly line, the first assembly line 8 further comprises an auxiliary assembly line 7 for assembling the connecting rod wheel component 23. The auxiliary assembly line 7 comprises a first station for assembling the wheel frame 232 and a second station for assembling the connecting arm 231 and the wheel frame 232. The connecting rod wheel component 23 assembled and formed at the second station is moved to the assembling station 82 by a manipulator. After the assembly of the connecting rod wheel component is completed by the auxiliary assembly line 7, the connecting rod wheel component 23 is transported to the assembling station 82 and is installed on the front frame 2 so as to improve the production efficiency.

Figure 24:
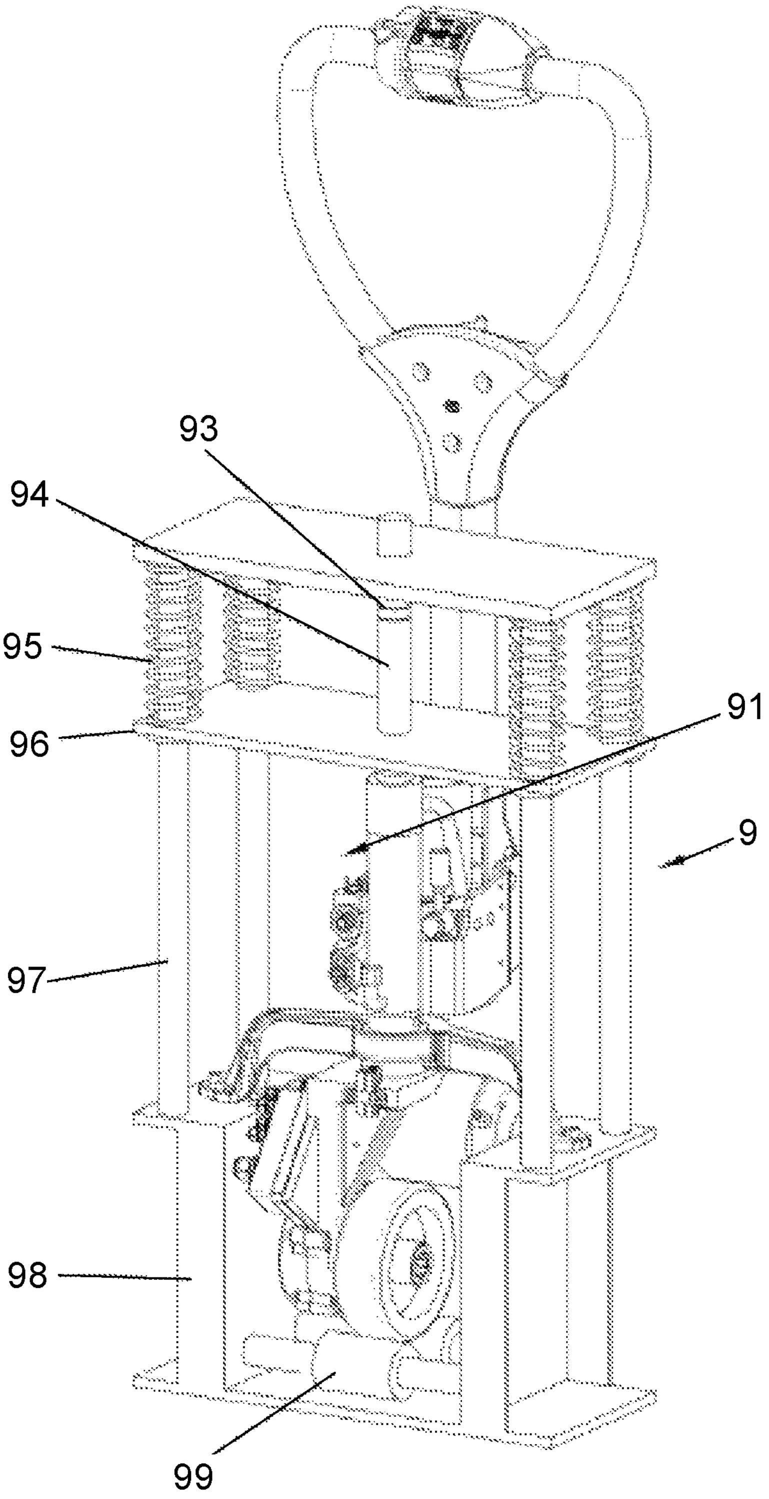
FIG. 24 is a front perspective structural schematic diagram of a detection tool for use with the assembly line according to the embodiment of FIG. 23.

The detection tool 9 of FIG. 24 includes an upward extending U-shaped bracket 98 and a counterweight simulation block %. A roller 99 capable of rolling is provided at the inner bottom of the bracket 98. Each of the four corners at the top of the bracket 98 are provided with a guide column 97, respectively. The tops of the four guide columns 97 are fixedly connected to the same top plate at the top of the detection tool 9. Four corners of the counterweight simulation block 96 are sleeved on the four guide columns 97, respectively. The counterweight simulation block 96 is connected with a bottom surface of the top plate via a plurality of springs 95.

A cylinder 94 with a scale 93 is provided in the middle of the counterweight simulation block 96. A through hole is provided in the center of the top plate for the cylinder 94 to pass through. The counterweight simulation block 96 and the bottom of a bracket 98 form a clamping cavity 91 in which the rear frame 1 is placed. Both upper ends of the bracket 98 are provided with fixing holes connected with a bearing bridge 122, respectively. The detection tool 9 mainly detects the performance of the rear frame 1 in two aspects. On the one hand, it detects whether the hydraulic component 12 in the rear frame 1 lifts normally, and on the other hand, it detects whether the wheel driving direction and the wheel driving speed are normal. The specific detection steps of the detection tool 9 are as follows:

Step 1: placing the rear frame 1 in the detection tool 9, placing the driving wheel component 136 on the roller 99, abutting the top of the hydraulic component 12 against the counterweight simulation block 96, and connecting both ends of the bearing bridge 122 to the bracket 98, respectively;

Step 2: powering on the rear frame 1, and initializing the system to detect whether the power supply of the line is normal;

Step 3: rotating the operating handle 11, and rotating the driving wheel component 136 on the roller 99 in situ to detect whether the rotating direction of the driving wheel is normal;

Step 4: actuating the lifting button so that the oil cylinder 121 can act as though it is lifting the front frame of the carrier vehicle, and pressing the lifting button continuously, wherein the oil cylinder 121 lifts and jacks the counterweight simulation block 96, and the counterweight simulation block 96 has a height between 1 cm and 10 cm in the scale 93 after being lifted, so as to detect whether the lifting pressure is within a reasonable range and whether the hydraulic component 12 works normally.

Those skilled in the art will understand that the embodiments of the present disclosure described above and shown in the drawings are only taken as examples and do not limit the claims of the present application.

The purpose of the present disclosure has been achieved. The functions and structural principles of the present disclosure have been shown and explained in the embodiments, and the implementation may be modified without deviating from the principles of the disclosure.

The invention claimed is:

1. A carrier in a configuration of a pallet truck vehicle, comprising:

a front frame and a rear frame, wherein the rear frame is readily attachable to and detachable from the front frame;

the front frame further comprising a frame body, at least one battery structure installed along a vertically extending inner front side wall of the frame body and a wheel connecting rod component provided transversely at a bottom of the frame body;

the at least one battery structure further comprising a battery main body, a pluggable component and a handle, wherein the handle is connected to a top or side of the battery main body;

the pluggable component further comprising at least one pluggable end which is insertable into the battery main body wherein the pluggable component becomes electrified;

the frame body further comprising an installing guide rail on the vertically extending inner front side wall of the frame body, and an opening at a top or side of the frame body, wherein the battery main body is received by the installing guide rail vertically or transversely from the opening;

the wheel connecting rod component further comprising a connecting arm at a rear of the connecting rod component;

the rear frame further comprising an operating handle, a handle joint base, a hydraulic component, a bearing component and a drive assembly, wherein a bottom end of the operating handle is rotatably connected to the handle joint base;

the handle joint base further comprising a frame and a microswitch connected to the frame, a trigger component disposed on the frame, wherein the trigger component further comprises a movable trigger part having a first end that abuts the microswitch and triggers the microswitch to be turned on or off depending on the position of the trigger part, and a second end of the trigger part abuts a bottom end of the operating handle and drives the trigger part to move when rotating the operating handle upward or downward;

wherein the handle joint base is connected to the hydraulic component, and the hydraulic component further comprises an oil cylinder;

the bearing component further comprising a bearing bridge connected to bridge lugs at respective opposed ends of the bearing bridge, and a middle part of the bearing bridge is sleeved on the oil cylinder, wherein the oil cylinder is fixedly connected with a top shaft head end of the driving assembly via a pin shaft, the top of the hydraulic component is connected to the front frame, and the connecting arms are detachably and rotatably connected to the bridge lugs, respectively.

2. The carrier according to claim 1, wherein the microswitch comprises a contact capable of triggering to be turned on or off, wherein part of a surface of the contact is exposed outside a housing of the microswitch and comprise an arc-shaped surface; an outer wall surface of the first end of the trigger part comprises a wedge-shaped surface which abuts the arc-shaped surface of the contact; the operating handle rotates to press the second end of the trigger part and urges the outer wall surface of the first end of the trigger part to abut and apply force to the arc-shaped surface of the contact, driving the contact to move into the housing to trigger the microswitch to be turned on or off.

3. The carrier according to claim 1, wherein the driving assembly comprises a box body, a driving motor, a driving wheel component and a controller, wherein the driving wheel component and the driving motor are installed on the box body, and the output shaft of the driving motor indirectly drives the driving wheel component to rotate through meshing of a gear set; wherein the controller is connected to the box body and located on a side wall near a top of the box body, and the controller is connected with a driving motor circuit.

4. The carrier according to claim 3, wherein the side wall near the top of the box body is provided with an installation area for installing the controller, the installation area is inclined and provided with a plurality of installation holes, the controller is provided with a plurality of connection holes corresponding to the installation holes, the controller is connected and fixed on the installation area by screws penetrating through the connection holes and the installation holes; wherein the driving wheel component is provided on a side wall near a bottom end of the box body, the driving motor is provided on the same side wall of the box body as the driving wheel component, and the driving motor is positioned above the driving wheel component; and wherein the gear set comprises a first gear, a second gear, a third gear and a fourth gear which are sequentially meshed in oblique teeth and connected in parallel.

5. The carrier according to claim 1, wherein a bearing base is provided proximate a middle of the bearing bridge, and a bottom end of the oil cylinder penetrates through an inner ring of the bearing base; wherein the inner ring of the bearing base is provided with a self-lubricating bearing, and an inner ring of the self-lubricating bearing is sleeved on an outer wall surface of a bottom end of the oil cylinder; wherein a thrust ball bearing is installed above the bearing base, the thrust ball bearing is located on a common axis with the bearing base, a retaining ring is provided on the outer wall surface of the bottom end of the oil cylinder, and the thrust ball bearing is clamped between the retaining ring and the bearing base.

6. The carrier according to claim 1, wherein one end of the top of the battery main body of the at least one battery structure is provided with a fixedly mounted elastically deformable bar, and a gap exists between the elastically deformable bar and a central portion of a top of the battery main body; wherein the pluggable component comprises an inclined guide block; wherein when the pluggable component is plugged into the battery main body, the inclined guide block is inserted into the gap and an inclined surface of the inclined guide block abuts against and forces an upper end of the elastically deformable bar to deflect outward.

7. The carrier according to claim 6, wherein the vertically extending inner front side wall of the front frame is provided with a U-shaped installing guide rail, a top of the front frame is provided with an opening, a handle is connected to the top of the battery main body, the battery main body is vertically insertable into the installing guide rail for fixation via the opening, and both the handle and the pluggable component are located at the opening.

8. The carrier according to claim 7, wherein an inner side wall of the frame body of the front frame is provided with a frame limiting groove; wherein when the battery main body is provided in the installing guide rail, the elastically deformable bar is positioned at the frame limiting groove; and wherein when the pluggable component is plugged into the battery main body and electrified, an end part of the elastically deformable bar deflects and is moved into the frame limiting groove in a locked position, so as to limit the battery main body from moving upward and being separated from the installing guide rail.

9. The carrier according to claim 1, wherein the carrier comprises two battery structures, a transverse installing guide rail is provided on the vertically extending inner front side wall of the front frame, two opposite sides of the frame body each have an opening, respectively; wherein each battery structure includes a battery main body, a handle is connected to a side of each battery main body, and the two battery structures are movable transversely inward through the respective two openings to be located on the installing guide rail in the front frame, respectively.

10. The carrier according to claim 9, wherein a bottom of each battery main body is provided with a positioning groove which is recessed inward, the vertically extending inner front side wall of the front frame includes a rearward extending limit stopper, the limit stopper is located in a middle of the installing guide rail and divides the installing guide rail into two installation areas evenly, a resilient tab is symmetrically provided on the installing guide rail in each installation area; wherein when each battery main body is moved transversely inward, the respective resilient tab is deformed and eventually reaches the positioning groove in the bottom of the battery main body to be in a removable locked position; and wherein an installing channel is provided at a top of the front frame, the pluggable component comprises two pluggable ends, and the pluggable component is vertically installed from the installing channel and is plugged into and electrified with the tops of the two battery main bodies.

* * * * *